(12) United States Patent
Sengupta et al.

(10) Patent No.: US 9,514,211 B2
(45) Date of Patent: Dec. 6, 2016

(54) HIGH THROUGHPUT DATA MODIFICATIONS USING BLIND UPDATE OPERATIONS

(71) Applicant: Microsoft Technology Licensing, LLC, Redmond, WA (US)

(72) Inventors: Sudipta Sengupta, Redmond, WA (US); David Bruce Lomet, Redmond, WA (US); Justin Jon Levandoski, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 257 days.

(21) Appl. No.: 14/335,927

(22) Filed: Jul. 20, 2014

(65) Prior Publication Data

US 2016/0019279 A1 Jan. 21, 2016

(51) Int. Cl.
*G06F 17/30* (2006.01)

(52) U.S. Cl.
CPC ... *G06F 17/30581* (2013.01); *G06F 17/30339* (2013.01); *G06F 17/30348* (2013.01)

(58) Field of Classification Search
CPC .... G06F 17/30; G06F 17/00; G06F 17/30581; G06F 17/30339; G06F 17/30348
USPC ................................................ 707/600–899
See application file for complete search history.

(56) References Cited

U.S. PATENT DOCUMENTS

| | | |
|---|---|---|
| 4,945,474 A | 7/1990 | Elliott et al. |
| 5,043,866 A | 8/1991 | Myre et al. |
| 5,123,104 A | 6/1992 | Levine et al. |
| 5,212,788 A | 5/1993 | Lomet et al. |
| 5,247,672 A | 9/1993 | Mohan |
| 5,317,731 A | 5/1994 | Dias et al. |
| 5,335,343 A | 8/1994 | Lampson et al. |
| 5,440,727 A | 8/1995 | Bhide et al. |
| 5,781,910 A | 7/1998 | Gostanian et al. |
| 5,845,292 A | 12/1998 | Bohannon et al. |
| 5,870,758 A | 2/1999 | Bamford et al. |
| 5,870,763 A | 2/1999 | Lomet |
| 5,966,706 A | 10/1999 | Biliris et al. |
| 6,085,200 A | 7/2000 | Hill et al. |
| 6,185,699 B1 | 2/2001 | Haderle et al. |
| 6,282,605 B1 | 8/2001 | Moore |
| 6,581,132 B1 | 6/2003 | Kakinuma et al. |

(Continued)

FOREIGN PATENT DOCUMENTS

| | | |
|---|---|---|
| EP | 0465018 B1 | 5/1997 |
| EP | 2144177 A2 | 1/2010 |

(Continued)

OTHER PUBLICATIONS

Rashid, Layali, "Exploiting Multithreaded Architectures to Improve Data Management Operations," Retrieved May 11, 2012 at <<http://blogs.ubc.ca/lrashid/files/2011/01/layali_msc_thesis.pdf>>, University of Calgary, 2007, 117 pages.

(Continued)

*Primary Examiner* — Isaac M Woo
(74) *Attorney, Agent, or Firm* — Alin Corie; Sandy Swain; Micky Minhas

(57) ABSTRACT

Update requests that specify updates to a logical page associated with a key-value store are obtained. Updates to the logical page are posted using the obtained plurality of update requests, without accessing the logical page via a read operation.

20 Claims, 16 Drawing Sheets

(56) References Cited

U.S. PATENT DOCUMENTS

| | | |
|---|---|---|
| 6,978,279 B1 | 12/2005 | Lomet et al. |
| 7,039,773 B2 | 5/2006 | Hu et al. |
| 7,065,537 B2 | 6/2006 | Cha et al. |
| 7,293,028 B2 | 11/2007 | Cha et al. |
| 7,305,421 B2 | 12/2007 | Cha et al. |
| 7,426,559 B2 | 9/2008 | Hamel et al. |
| 7,472,139 B2 | 12/2008 | Nishikawa et al. |
| 7,747,589 B2 | 6/2010 | Lomet |
| 7,962,693 B1 | 6/2011 | Bumbulis |
| 8,019,938 B2 | 9/2011 | Flynn et al. |
| 8,150,893 B2 | 4/2012 | Bohannon et al. |
| 8,165,988 B2 | 4/2012 | Shau et al. |
| 8,170,997 B2 | 5/2012 | Lomet et al. |
| 8,244,667 B1 | 8/2012 | Weinberger et al. |
| 8,589,341 B2 | 11/2013 | Golde et al. |
| 8,868,514 B2 | 10/2014 | Lomet et al. |
| 9,003,162 B2 | 4/2015 | Lomet et al. |
| 2002/0138446 A1 | 9/2002 | Antonin et al. |
| 2003/0061537 A1 | 3/2003 | Cha et al. |
| 2003/0204698 A1 | 10/2003 | Sachedina et al. |
| 2003/0208464 A1 | 11/2003 | Lee et al. |
| 2004/0260726 A1 | 12/2004 | Hrle et al. |
| 2006/0004839 A1 | 1/2006 | Nagasawa et al. |
| 2006/0167960 A1 | 7/2006 | Lomet |
| 2006/0253502 A1 | 11/2006 | Raman et al. |
| 2007/0011105 A1 | 1/2007 | Benson et al. |
| 2007/0112885 A1 | 5/2007 | Farr |
| 2007/0239758 A1 | 10/2007 | Devine et al. |
| 2007/0282848 A1 | 12/2007 | Kiilerich et al. |
| 2008/0065670 A1 | 3/2008 | Cha et al. |
| 2009/0240664 A1 | 9/2009 | Dinker et al. |
| 2010/0030818 A1 | 2/2010 | Cooper et al. |
| 2010/0191713 A1 | 7/2010 | Lomet et al. |
| 2010/0191919 A1 | 7/2010 | Bernstein et al. |
| 2011/0179000 A1 | 7/2011 | Shaughnessy |
| 2011/0252000 A1 | 10/2011 | Diaconu et al. |
| 2011/0295913 A1* | 12/2011 | Enbutsu ............ G06F 17/30312 707/812 |
| 2012/0005168 A1 | 1/2012 | Lomet et al. |
| 2012/0210021 A1 | 8/2012 | Flynn et al. |
| 2013/0110767 A1 | 5/2013 | Tatemura et al. |
| 2013/0226931 A1 | 8/2013 | Hazel et al. |
| 2013/0339312 A1 | 12/2013 | Schreter |
| 2013/0346725 A1 | 12/2013 | Lomet et al. |
| 2014/0149527 A1 | 5/2014 | Lee et al. |
| 2016/0110403 A1 | 4/2016 | Lomet et al. |

FOREIGN PATENT DOCUMENTS

| | | |
|---|---|---|
| WO | 2016014368 A1 | 1/2016 |
| WO | 2016064575 A1 | 4/2016 |

OTHER PUBLICATIONS

Mao, et al., "Cache Craftiness for Fast Multicore Key-Value Storage," Retrieved May 11, 2012 at <<http://www.read.seas.harvard.edu/-kohler/pubs/mao12cache.pdf>>, In Proceedings of the 7th ACM European Conference on Computer Systems (EuroSys '12), Apr. 10-13, 2012, pp. 183-196.

Bayer, et al., "Prefix B-Trees," Retrieved May 10, 2012 at <<http://ict.pue.udlap.mx/people/carlos/is215/papers/p11-bayer.pdf>>, In ACM Transactions on Database Systems (TODS), vol. 2, Issue 1 (1977), pp. 11-26.

Chen, et al., "Fractal Prefelching B±Trees: Optimizing Both Cache and Disk Performance," Retrieved May 10, 2012 at <<http://www.cs.cmu.edu/afs/cs.cmu.edu/Web/People/chensm/papers/fpbl ree.pdf>>, In Proceedings of the ACM SIGMOD International Conference on Management of Data (2002), pp. 157-168.

Debnath, et al., "FlashStore: High Throughput Persistent Key-Value Store," Retrieved May 10, 2012 at <<http://www.vldb.org/pvldb/vldb2010/papers/104.pdf>>, In Proceedings of the VLDB Endowment, vol. 3, No. 2 (2010), pp. 1414-1425.

Lehman, et al., "Efficient Locking for Concurrent Operations on B-Trees," Retrieved May 10, 2012 at <<http://www.cs.cornell.edu/courses/CS4411/2009sp/blink.pdf>>, In ACM Transactions on Database Systems, vol. 6, No. 4 (1981), pp. 650-670.

Lomet, David, "The Evolution of Effective B-tree Page Organization and Techniques: A Personal Account," Retrieved May 10, 2012 at <<http://www.cs.duke.edu/courses/spring03/cps216/papers/lomel-2001.pdf>>, In ACM SIGMOD Record (2001), vol. 30, Issue 3, pp. 64-69.

Lomet, et al., "Implementing Performance Competitive Logical Recovery," Retrieved May 10, 2012 at <<http://arxiv.org/ftp/arxiv/papers/1105/1105.4253.pdf>>, In Proceedings of the VLDB Endowment, vol. 4, No. 7, Aug. 2011, pp. 430-439.

Michael, Maged M., "Hazard Pointers: Safe Memory Reclamation for Lock-Free Objects," Retrieved May 10, 2012 at <<http://ieeexplore.ieee.org/sl amp/slamp.jsp?tp=&arnumber=1291819>>, In IEEE Transactions on Parallel and Distributed Systems, vol. 15, No. 6 (2004), pp. 491-504.

Nyberg, et al., "AlphaSort: A Cache-Sensitive Parallel External Sort," Retrieved May 10, 2012 at <<http://users.xfce.org/-benny/files/AlphaSort.pdf>>, In the VLDB Journal—The International Journal on Very Large Data Bases, vol. 4, Issue 4 (1995), pp. 603-627.

Pugh, William, "Skip Lists: A Probabilistic Alternative to Balanced Trees," Retrieved May 10, 2012 at <<http://citeseerx.isl.psu.edu/viewdoc/download?doi=10.1.1.85.9211 &rep=rep1&lype=pdf>>, Communications of the ACM, vol. 33, No. 6 (1990), pp. 668-676.

Roh, et al., "B+-Tree Index Optimization by Exploiting Internal Parallelism of Flash-based Solid State Drives," Retrieved May 11, 2012 at <<http://vldb.org/pvldb/vol5/p286_hongchanroh_vldb2012.pdf>>, In 38th International Conference on Very Large Data Bases, vol. 5, No. 4 (Aug. 2012), pp. 286-297.

Wu, et al., "An Efficient B-tree Layer Implementation for Flash-Memory Storage Systems," Retrieved May 11, 2012 at <<http://citeseerx.isl.psu.edu/viewdoc/download?doi=10.1.1.160.3814 &rep=rep1&lype=pdf>>, In ACM Transactions on Embedded Computing Systems, vol. 6, No. 3 (2007), 23 pages.

"Amazon DynamoDB", Retrieved May 10, 2012 at <<http://aws.amazon.com/dynamodb/>>, 15 pages.

Saldanha, N. et al, "Implementation of PALM: Parallel Architecture-Friendly Latch-Free Modifications to B+ Trees on Many-Core Processors", May 8, 2012, 8 pages. Available at: http://cs.nyu.edu/~lerner/spring12/MultiCoreProgrCalendar.html.

Office Action mailed Mar. 14, 2014 for Lomet, et al., "Structuring Storage Based on Latch-Free B-Trees", U.S. Appl. No. 13/527,880, filed Jun. 20, 2012, 32 pages.

"MemSQL Architecture—The Fast (MVCC, InMem, LockFree, CodeGen) And Familiar (SQL)", Published on: Aug. 14, 2012, Available at: http://highscalability.com/blog/2012/8/14/memsql-architecture-the-fast-mvcc-inmem-lockfree-codegen-and.html.

Delaney, Kalen, "SQL Server In-Memory OLTP Internals Overview", In White Paper of SQL Server, Mar. 2014, 50 pages.

Rastogi, et al., "Versioning Algorithms for Improving Transaction Predictability in Real-time Main-Memory Databases", Retrieved on: Sep. 10, 2014, Available at: <<http://Www.Cse.litb.Ac.In/~Sudarsha/Pubs-Dir/Datablitz-Rtss-Final.Pdf>>, Real-Time Systems, vol. 19, No. 3 (2000), pp. 283-302.

"Redo Processing", Published on: Oct. 7, 2011, Available at: http://www.datadisk.co.uk/html_docs/oracle_dg/redo.htm.

Pollett, Chris, "Checkpointing, Redo, Undo/Redo Logging", Published on: Apr. 20, 2005, Available at: http://www.cs.sjsu.edu/faculty/pollett/157b.12.05s/Lec20042005.pdf.

Zaitsev, Peter, "MVCC: Transaction IDs, Log Sequence Numbers and Snapshots", Published on: Dec. 19, 2007, Available at: http://www.percona.com/blog/2007/12/19/mvcc-transaction-ids-log-sequence-numbers-and-snapshots/.

Graefe, et al., "Transaction Support for Indexed Summary Views", In Proceedings of the ACM SIGMOD International Conference on Management of Data, Jun. 13, 2004, pp. 323-334.

Badarla, Venkata Ramana, "Concurrency Control Techniques", Lecture Slides, Retrieved on: Sep. 10, 2014, Available at: http://home.iitj.ac.in/~ramana/ch12-concurrency-control.pdf.

(56) References Cited

OTHER PUBLICATIONS

Diaconu, et al., "Hekaton: SQL Server's Memory-Optimized OLTP Engine", In Proceedings of ACM SIGMOD International Conference on Management of Data, Jun. 22, 2013, pp. 1243-1254.
Bernstein, et al. "Principles of Transaction Processing", Morgan Kaufmann, 1996.
Levandoski, et al., "Indexing on Modern Hardware: Hekaton and Beyond", In Proceedings of ACM SIGMOD International Conference on Management of Data, Jun. 22, 2014, pp. 717-720.
Mohan, et al., "ARIES: A Transaction Recovery Method Supporting Fine-Granularity Locking and Partial Rollbacks Using Write-Ahead Logging", Retrieved at << http://www.cs.berkeley.edu/~brewer/cs262/Aries.pdf >>, ACM Transactions on Database Systems (TODS), vol. 17, No. 1, Mar. 1992, pp. 94-162.
Stonebraker, et al., "One Size Fits All": An Idea Whose Time Has Come and Gone, In Proceedings of ICDE 2005, 2005, 10 pages.
Lomet, et al., "Multi-Version Concurrency via Timestamp Range Conflict Management", In Proceedings of IEEE 28th International Conference on Data Engineering, Apr. 1, 2012, 12 pages.
"Inside Microsoft SQL Server 2005: The Storage Engine", Retrieved at << http://www.microsoft.com/PRODUCTS/info/product.aspx?view=22&pcid=6bf6f680-9f37-403b-85ba-3fbee8c27f00&type=ovr >>, Retrieved Date: Nov. 9, 2009, pp. 2.
Reed, David Patrick, "Naming and Synchronization in a Decentralized Computer System", In Thesis of Massachusetts Institute of Technology. Dept. of Electrical Engineering and Computer Science, Sep. 1978, 187 pages.
Lomet, et al., "Locking Key Ranges with Unbundled Transaction Services", Retrieved at << http://www.research.microsoft.com/pubs/81295/Part-Lock.pdf >>, Proceedings of the VLDB Endowment, vol. 2, No. 1, Aug. 24-28, 2009, pp. 12.
Lomet, et al., "Latch-Free, Log-Structured Storage for Multiple Access Methods", U.S. Appl. No. 13/924,567, filed Jun. 22, 2013, 65 pages.
"Building the Customer-Centric Systems Architecture", << http://mike2.openmethodology.org/wiki/Building_the_Customer-Centric_Systems_Architecture>>, last accessed Nov. 17, 2008. 3 pages.
Greenwood, P., et al. Reference Architecture v3.0, <<http://www.aosd-europe.net/deliverables/d103.pdf>>, Jan. 8, 2008. 49 pages.
Kasshyap, Aditya, "File System Extensibility and Reliability Using an in-Kernel Database," <<http://www.fsl.cs.sunysb.edu/docs/kbdbfsmsthesis/index.html>>, Last accessed Nov. 17, 2008. 24 pages.
Office Action mailed Jul. 22, 2011 for Lomet et al., "Unbundled Storage Transaction Services," U.S. Appl. No. 12/362,481, filed Jan. 29, 2009, 11 pages.
Response filed Oct. 26, 2011, in response to Office Action mailed Jul. 22, 2011 for Lomet et al., "Unbundled Storage Transaction Services," U.S. Appl. No. 12/362,481, filed Jan. 29, 2009, 15 pages.
Notice of Allowance mailed Dec. 29, 2011 for Lomet et al., "Unbundled Storage Transaction Services," U.S. Appl. No. 12/362,481, filed Jan. 29, 2009, 12 pages.
Office Action mailed Jan. 30, 2013 for Lomet et al., "Transaction Support for Distributed Data," U.S. Appl. No. 12/986,962, filed Jan. 7, 2011, 35 pages.
Response filed Apr. 30, 2013, in response to Office Action mailed Jan. 30, 2013 for Lomet et al., "Transaction Support for Distributed Data," U.S. Appl. No. 12/986,962, filed Jan. 7, 2011, 13 pages.
Office Action mailed Aug. 22, 2013 for Lomet et al., "Transaction Support for Distributed Data," U.S. Appl. No. 12/986,962, filed Jan. 7, 2011, 39 pages.
Response filed Nov. 22, 2013, in response to Office Action mailed Aug. 22, 2013 for Lomet et al., "Transaction Support for Distributed Data," U.S. Appl. No. 12/986,962, filed Jan. 7, 2011, 13 pages.
Office Action mailed Dec. 16, 2013 for Lomet et al., "Transaction Support for Distributed Data," U.S. Appl. No. 12/986,962, filed Jan. 7, 2011, 41 pages.
Response filed Mar. 17, 2014, in response to Office Action mailed Dec. 16, 2013 for Lomet et al., "Transaction Support for Distributed Data," U.S. Appl. No. 12/986,962, filed Jan. 7, 2011, 13 pages.
Notice of Allowance mailed Jul. 8, 2014 for Lomet et al., "Transaction Support for Distributed Data," U.S. Appl. No. 12/986,962, filed Jan. 7, 2011, 143 pages.
Office Action mailed Jun. 7, 2012 for Lomet et al., "Logical Recovery with Unbundled Transaction Services," U.S. Appl. No. 12/827,941, filed Jun. 30, 2010, 9 pages.
Response filed Oct. 8, 2012, in response to Office Action mailed Jun. 7, 2012 for Lomet et al., "Logical Recovery with Unbundled Transaction Services," U.S. Appl. No. 12/827,941, filed Jun. 30, 2010, 11 pages.
Office Action mailed Mar. 21, 2013 for Lomet et al., "Logical Recovery with Unbundled Transaction Services," U.S. Appl. No. 12/827,941, filed Jun. 30, 2010, 11 pages.
Response filed Jul. 22, 2013, in response to Office Action mailed Mar. 21, 2013 for Lomet et al., "Logical Recovery with Unbundled Transaction Services," U.S. Appl. No. 12/827,941, filed Jun. 30, 2010, 13 pages.
Office Action mailed Jan. 17, 2014 for Lomet et al., "Logical Recovery with Unbundled Transaction Services," U.S. Appl. No. 12/827,941, filed Jun. 30, 2010, 5 pages.
Notice of Allowance mailed Jan. 31, 2014 for Lomet et al., "Logical Recovery with Unbundled Transaction Services," U.S. Appl. No. 12/827,941, filed Jun. 30, 2010, 17 pages.
Chow, et al., Distributed Operating Systems and Algorithms, Addison Wesley Longman, Inc., Reading, Massachusetts, 1997, Title Pages, Preface and Sections 4.3, 6.3 and 12.1, pp. ii, iii, vii-xii, 123-127, 207-218 and 425-452.
Lomet, D., "Persistent Applications Using Generalized Redo Recovery," Proceedings, 14th International Conference on Data Engineering, IEEE, 1998, pp. 154-163.
Lomet et al, "Redo Recovery after System Crashes," Proceedings of the 21st VLDB Conference, Zurich, Switzerland, 1995, pp. 457-468.
Lomet et al., "Implementing Performance Competitive Logical Recovery", Proceedings of the VLDB Endowment, vol. 4, Issue 7, Apr. 2011, pp. 430-439.
Sears, et al., "Segment-Based Recovery: Write-Ahead Logging Revisited", Retrieved at << http://www.vldb.org/pvldb/2/vldb09-583.pdf >>, Proceedings of the VLDB Endowment, vol. 2, No. 1, Aug. 24-28, 2009, pp. 12.
Lomet, et al., "Logical Logging To Extend Recovery To New Domains", Retrieved at << http://www.markrtuttle.com/papers/lt99-sigmod.pdf >>, ACM SIGMOD Record, vol. 28, No. 2, Jun. 1999, pp. 12.
Lomet, et al., "A Theory of Redo Recovery", Retrieved at << www.markrtuttle.com/papers/lt03.ps >>, International Conference on Management of Data, Proceedings of the 2003 ACM SIGMOD international conference on Management of data, Jun. 9-12, 2003, pp. 10.
Barga, et al., "Improving Logging and Recovery Performance in Phoenix/App—Published Date: 2004", Retrieved at << http://citeseerx.ist.psu.edu/viewdoc/download;jsessionid=FBA3928EB4FE8C007A31816069BDFAOD?doi=1 0.1.1. 72. 140&rep=rep1 &type= pdf>>, Proceedings of the 20th International Conference on Data Engineering, 2004, pp. 12.
Aguilera, et al., "Sinfonia: A New Paradigm for Building Scalable Distributed Systems", Retrieved at<< http://www.hpl.hp.com/personai!Mehui_Shah/papers/sosp_2007_ aguilera.pdf >>,SOSP, Oct. 14-17, 2007, pp. 16.
"Amazon SimpleDB", Retrieved at<< http://aws.amazon.com/simpledb/ >>,Retrieved Date: Sep. 23, 2010, pp. 7.
Barga, et al., "Recovery Guarantees for Internet Applications", Retrieved at<< http://citeseerx.ist.psu.edu/viewdoc/download?doi= 1 0.1.1.6.450&rep=rep1 &type= pdf>>, ACM Transactions on Internet Technology, vol. 4 No. 3, Aug. 2004, p. 1-42.
Hamilton, James, "Perspectives", Retrieved at<< http:l/perspectives.mvdirona.com/2008/07/10/GoogleMegastore.aspx >>, Jul. 10, 2008, pp. 5.
Brantner, et al., "Building a Database on S3", Retrieved at<< http://citeseerx.ist.psu.edu/viewdoc/download?doi=1 0.1.1.

(56) References Cited

OTHER PUBLICATIONS 141.5679&rep=rep1&type=pdf >>, International Conference on Management of Data, Jun. 9-12, 2008, p. 251-263.
Sears et al., "Stasis: Flexible Transactional Storage", In Proceedings of the OSDI '06: 7th USENIX Symposium on Operating Systems Design and Implementation, Nov. 6-8, 2006, pp. 29-44.
Barga, et al. "Recovery Guarantees for Multi-tier Applications", In Proceedings of The 18th ICDE '02 Conference, San Jose, 2002, 12 pages.
Bernstein, et al. "Implementing Recoverable Requests Using Queues", In Proceedings of SIGMOD Conference on Management of data, 1990, Atlantic City, 1990, pp. 112-122.
Weikum, et al., "Multi-Level Recovery." In Proceedings of PODS 1990: 109-123, 1990.
Lomet, et al. "Robust Web Services via Interaction Contracts", In Proceedings of TES Workshop, Toronto, 2004, pp. 1-14.
Lomet, et al. "Persistent Middle Tier Components without Logging", In Proceedings of IDEAS 2005, Montreal, 2005, 10 pages.
Lomet, et al. "MLR: A Recovery Method for Multi-Level Systems." In Proceedings of SIGMOD 1992, San Diego, CA, 1992, 12 pages.
Lomet, et al. "Advanced Recovery Techniques in Practice," in Recovery Mechanisms in Database Systems, Prentice Hall PTR 1998, 13 pages.
Lomet, et al., "Concurrency and Recovery for Index Trees." VLDB Journal (1997) vol. 6, pp. 224-240.
Agrawal, et al. "Integrated concurrency control and recovery mechanisms: Design and performance evaluation". ACM TODS, 10(4): 529-564, 1985.
Agrawal, et al. The performance of concurrency control and recovery algorithms for transaction-oriented database systems. IEEE Database Eng. Bull., vol. 8, No. 2, (Jun. 1985), pp. 58-67.
Franklin, et al. "Crash Recovery in client-server EXODUS," In Proceedings of SIGMOD 1992, pp. 165-174, 1992.
Haas, et al. "Starburst mid-flight: As the dust clears". In Proceedings of IEEE Transactions on Knowledge and Data Engineering (TKDE), vol. 2, No. 1, Mar. 1990, pp. 143-160.
IEEE TCDE. Bulletin of the TC on Data Engineering. IEEE Computer Society, vol. 8, No. 2, Jun. 1985. Available at: http://sites.computer.org/debull/85JUN-CD.pdf.
Jhingran, et al. "Analysis of recovery in a database system using a write-ahead log protocol." In Proceedings of SIGMOD 1992, pp. 175-184, 1992.
Mohan, et al. "ARIES/CSA: A Method for Database Recovery in Client-Server Architectures". In Proceedings of SIGMOD 1994, pp. 55-66, 1994.
Salles, et al. "An Evaluation of Checkpoint Recovery for Massively Multiplayer Online Games". In Proceedings of PVLDB 2009, vol. 2, No. 1, 2009, 12 pages.
Brantner, et al. "Building a database on S3". In Proceedings of SIGMOD 2008, Jun. 9-12, 2008, pp. 251-264.
Berenson, et al. "A Critique of ANSI SQL Isolation Levels". In Proceedings of SIGMOD 1995, 1995, pp. 1-10.
Cahill, et al. "Serializable Isolation for Snapshot Databases". In Proceedings of SIGMOD 2008, 2008, pp. 729-738.
Gray, et al. "The Recovery Manager of the System R Database Manager". Computing Surveys, vol. 13, No. 2, Jun. 1981, pp. 221-242.
Harizopoulos, et al. "A Case for Staged Database Systems". In Proceedings of CIDR 2003, 12 pages.
Harizopoulos, et al. "OLTP Through the Looking Glass, and What We Found There". In Proceedings of SIDMOD 2008, Jun. 9-12, 2008, pp. 981-992.
Hellerstein, et al. "Architecture of a Database System". Foundations and Trends in Databases, vol. 1, No. 2 (2007) pp. 141-259.
Herlihy, et al. "Linearizability: a Correctness Criterion for Concurrent Objects." ACM Transactions on Programming Languages and Systems, vol. 12, No. 3, Jul. 1990,pp. 463-492.
Jones, et al. "The Atomic Manifesto: a Story in Four Quarks." ACM SIGOPS Operating Systems Review, vol. 39 Issue 2, Apr. 2005, pp. 41-46.

Lomet, D.B. "Key Range Locking Strategies for Improved Concurrency." In Proceedings of the 19th VLDB Conference, Dublin, Ireland, 1993, pp. 185-194.
Brewer, Dr. Eric A., Towards Robust Distributed Systems, Retrieved at<< http://www.cs.berkeley.edu/-brewer/cs262b-2004/PODC-keynote.pdf >>,Jul. 19, 2000, pp. 12.
Chang, et al., "Bigtable: A Distributed Storage System for Structured Data", Retrieved at<< http://static.googleusercontent.com/external_ contenUuntrusted _ dlcp/labs.google .com/en//papers/bigtable-osdi06. pdf > >, In Proceedings of the 7th Conference on USENIX Symposium on Operating Systems Design and Implementation, vol. 7, 2006, p. 1-14.
Cooper, et al., "PNUTS: Yahoo!'s hosted Data Serving Platform", Retrieved at<< http://citeseerx.ist.psu.edu/viewdoc/download?doi= 10.1.1.141.68&rep=rep1&type=pdf >>, VLDB, Aug. 24-30, 2008, pp. 12.
Das, et al., "EiasTraS: An Elastic Transactional Data Store in the Cloud", Retrieved at<< http://www.usenix.org/event/hotcloud09/tech/full_papers/das.pdf >>, Proceedings of the conference on Hot topics in cloud computing, 2009, pp. 5.
Das, et al., "G-Store: A Scalable Data Store for Transactional Multi-Key Access in the Cloud", Retrieved at<< http://www.cs.ucsb.edu/-sudipto/papers/socc10-das.pdf >>, Workshop on Cloud Computing in conjunction with SIGMOD, Jun. 10-11, 2010, pp. 12.
DeCandia, et al., "Dynamo: Amazon's Highly Available Key-value Store", Retrieved at<< http://s3.amazonaws.com/AllThingsDistributed/sosp/amazon-dynamo-sosp2007.pdf >>,21st Symposium on Operating Systems Principles, Oct. 14-17, 2007, p. 205-220.
Gilbert, et al., "Brewer's Conjecture and the Feasibility of Consistent, Available, Partition-tolerant Web Services", Retrieved at << http://citeseerx.ist.psu.edu/viewdoc/download?doi= 10.1.1.67.6951 &rep=rep1 &type= pdf>>, ACM SIGACT News, vol. 33 No. 2, Jun. 2002, pp. 12.
"Hbase", Retrieved at<< http://hbase.apache.org/ >>, Aug. 13, 2010, pp. 3.
Kossmann, et al., "An Evaluation of Alternative Architectures for Transaction Processing in the Cloud", Retrieved at << http://citeseerx.ist.psu.edu/viewdoc/download?doi=1 0.1.1.169.2041 &rep=rep1 &type= pdf>>, International Conference on Management of Data, Jun. 6-11, 2010, pp. 12.
Kraska, et al., "Consistency Rationing in the Cloud: Pay only when it Matters", Retrieved at<< http://www.dbis.ethz.ch/research/publications/ConsistencyRationing.pdf >>, VLDB, Aug. 24-28, 2009, pp. 12.
"Microsoft Windows Azure", Retrieved at<< http://www.microsoft.com/windowsazure/windowsazure/ >>, Retrieved Date: Sep. 23, 2010, pp. 3.
"Microsoft Common Log File System", Retrieved at<< http://tinyurl.com/2fwlmux >>, Retrieved Date: Sep. 23, 2010, pp. 2.
"TPC-W Benchmarks", Retrieved at<< http://www.tpc.org/tpcw/ >>, Retrieved Date: Sep. 23, 2010, pp. 2.
Vo, et al., "Towards Elastic Transactional Cloud Storage with Range Query Support", Retrieved at<< http://www.comp.nus.edu.sg/-ooibc/vldb10-ecstore.pdf >>, Proceedings of the VLDB Endowment, vol. 3, No. 1, Sep. 13-17, 2010.
Vogels, Werner, "Data Access Patterns in the Amazon.com Technology Platform", Retrieved at<< http://www.vldb.org/conf/2007/papers/special/p1-vogels.pdf >>, VLDB Endowment, Sep. 23-28, 2007, p. 1.
"Eventually Consistent", Retrieved at<< http://delivery.acm.org/1 0.1145/1470000/1466448/p14-vogels.pdf?key1=1466448 &key2=4311225821 &coii=GUIDE&di=GUIDE&CFID=1 05694312&CFTOKEN=81275856 >>, Oct. 2008, p. 14-19.
Wei, et al., "Scalable Transactions for Web Applications in the Cloud", Retrieved at<< http://citeseerx.ist.psu.edu/28 viewdoc/download;jsessionid=814EOD 113E EA504CC4A9FA 1 CDEF636CD?doi=10.1.1.148 .4519&rep=rep1&type=pdf >>, Proceedings of the 15th International Euro-Par Conference on Parallel Processing, 2009, pp. 12.
Wei, et al., "CioudTPS: Scalable Transactions for Web Applications in the Cloud", Retrieved at <<http://www.globule.org/publi/CSTWAC_ircs53.pdf >>, Feb. 15, 2010, p. 1-44.

(56) References Cited

OTHER PUBLICATIONS

Response filed Aug. 14, 2014, in response to Office Action mailed Mar. 14, 2014 for Lomet et al., "Structuring Storage Based on Latch-Free B-Trees ," U.S. Appl. No. 13/527,880, filed Jun. 20, 2012, 23 pages.
"Merge Operator", Retrieved on: Jun. 3, 2014, Available at: https://github.com/facebook/rocksdb/wiki/Merge-Operator, 10 pages.
Callaghan, Mark, "Types of writes", Published on: Apr. 17, 2014, Available at: http://smalldatum.blogspot.in/2014/04/types-of-writes.html, 3 pages.
Prohaska, Rich, "Fast Updates with TokuDB", Published on: Feb. 12, 2013, Available at: http://www.tokutek.com/2013/02/fast-updates-with-tokudb/, 2 pages.
Levandoski, et al., "The Bw-Tree: A B-tree for New Hardware Platforms", In IEEE 29th International Conference on Data Engineering, Apr. 8, 2013, 12 pages.
Levandoski, et al., "Latch-Free, Log-Structured Storage for Multiple Access Methods," U.S. Appl. No. 13/924,567, filed Jun. 22, 2013, 65 pages.
Levandoski, et al., "LLAMA: A Cache/Storage Subsystem for Modern Hardware," Retrieved Sep. 18, 2013 at <<http://db.disi.unitn.eu/pages/VLDBProgram/pdf/research/p853-levandoski.pdf>>, Proceedings of the VLDB Endowment, vol. 6, No. 10 (39th International Conference on Very Large Data Bases, Aug. 26, 2013, 12 pages.
Ailamaki, et al., "DBMSs on a Modern Processor: Where Does Time Go?", Retrieved Feb. 21, 2013 at <<http://citeseerx.ist.psu.edu/viewdoc/download;jsessionid=9ED1C19EE4BC4E4ADB4EF3181FC7926F?doi=10.1.1.103.8641&rep=rep1&type =pdf>>, In Proceedings of the 25th International Conference on Very Large Data Bases, Feb. 25, 1999, 12 pages.
"Amazon DynamoDB", Retrieved Feb. 21, 2013 at <<http://aws.amazon.com/dynamodb/>>, 1 page.
Astrahan, et al., "System R: Relational Approach to Database Management", Retrieved Feb. 26, 2013 at <<http://data1.org/download.php?id=3031>>, In Journal ACM Transactions on Database Systems, vol. 1, Issue 2, Jun. 1976, pp. 97-137.
Batory, et al., "GENESIS: An Extensible Database Management System", Retrieved Feb. 22, 2013 at <<http://ieeexplore.ieee.org/stamp/stamp.jsp?tp=&arnumber=9057>>, In IEEE Transactions on Software Engineering, vol. 14, No. 11, Nov. 1988, pp. 1711-1730.
Bayer, et al., "Organization and Maintenance of Large Ordered Indexes", Retrieved Feb. 21, 2013 at <<http://www.liacs.nl/~graaf/STUDENTENSEMINARIUM/OMLO.pdf>>, In Acta Informatica, vol. 1, Feb. 1972, pp. 173-189.
Bernstein, et al., "Hyder—A Transactional Record Manager or Shared Flash", Retrieved Feb. 22, 2013 at <<http://www.cidrdb.org/cidr2011/Papers/CIDR11_Paper2.pdf>>, In 5th Biennial Conference on Innovative Data Systems Research (CIDR'11), Jan. 9, 2011, pp. 9-20.
Debnath, et al., "SkimpyStash: RAM Space Skimpy Key-Value Store on Flash-Based Storage", Retrieved Feb. 26, 2013 at <<http://research.microsoft.com/pubs/145125/sigmod038-sengupta.pdf>>, In the ACM SIGMOD International Conference on Management of Data (SIGMOD'11), Jun. 12, 2011, 12 pages.
Effelsberg, et al., "Principles of Database Buffer Management", Retrieved Feb. 22, 2013 at <<http://users.informatik.uni-halle.de/~hinnebur/Lehre/Web_DBIIb/uebung3_p560-effelsberg.pdf>>, In ACM Transactions on Database Systems, vol. 9, No. 4, Dec. 1984, pp. 560-595.
Harizopoulos, et al., "OLTP Through the Looking Glass, and What We Found There", Retrieved Feb. 22, 2013 at <<http://nms.csail.mit.edu/~stavros/pubs/OLTP_sigmod08.pdf>>, In Proceedings of the ACM SIGMOD International Conference on Management of Data (SIGMOD'08), Jun. 9, 2008, 12 pages.
Hu, et al., "Write Amplification Analysis in Flash-Based Solid State Drives", Retrieved Feb. 21, 2013 at <<http://dmclab.hanyang.ac.kr/wikidata/ssd/2012_ssd_seminar/add_articles/write-ampl.pdf>>, In Proceedings of SYSTOR: The Israeli Experimental Systems Conference (SYSTOR'09), Article No. 10, May 4, 2009, 9 pages.
Kung, et al., "Concurrent Manipulation of Binary Search Trees," ACM Transactions on Database Systems, vol. 5, No. 3, Sep. 1980, pp. 354-382.
Larson, et al., "High-Performance Concurrency Control Mechanisms for Main-Memory Databases", Retrieved Feb. 22, 2013 at <<http://vldb.org/pvldb/vol5/p298_per-akelarson_vldb2012.pdf>>, In Proceedings of the Very Large Data Bases Endowment, vol. 5, No. 4, Aug. 27, 2012, pp. 298-309.
Lee, et al., "Design of Flash-Based DBMS: An In-Page Logging Approach", Retrieved Feb. 22, 2013 at <<https://cs.arizona.edu/~bkmoon/papers/sigmod07.pdf>>, In Proceedings of the ACM SIGMOD International Conference on Management of Data (SIGMOD'07), Jun. 12, 2007, pp. 55-66.
Levandoski, et al., "Deuteronomy: Transaction Support for Cloud Data", Retrieved Feb. 22, 2013 at <<http://research.microsoft.com/pubs/152654/Deut-TC.pdf>>, In 5th Biennial Conference on Innovative Data Systems Re-search (CIDR), Jan. 9, 2011, 11 pages.
Levandoski, et al., "The Bw-Tree: A B-tree for New Hardware Platforms", Retrieved Feb. 22, 2013 at <<http://research.microsoft.com/pubs/170384/bw-tree.pdf>>, In IEEE 29th International Conference on Data Engineering (ICDE), Apr. 8, 2013, 12 pages.
Lomet, David B., "Grow and Post Index Trees: Roles, Techniques and Future Potential", Retrieved Feb. 26, 2013 at <<http://www.google.co.in/url?sa=t&rct=j&q=grow%20and%20post%20index%20trees%3A%20roles%2C%20techniques%20and%20future%20potential&source=web&cd=1&cad=rja&ved=0CC4QFjAA&url>>, In Proceedings of the Second International Symposium on Advances in Spatial Databases, Aug. 1991, 24 pages.
Lomet, David B., "The Case for Log Structuring in Database Systems", Retrieved Feb. 22, 2013 at <<http://citeseerx.ist.psu.edu/viewdoc/download?doi=10.1.1.9.2604&rep=rep1&type=pdf>>, In Proceedings International Workshop on High Performance Transaction Systems, Sep. 1995, 5 pages.
Lomet, et al., "Unbundling Transaction Services in the Cloud", Retrieved Feb. 22, 2013 at <<http://arxiv.org/ftp/arxiv/papers/0909/0909.1768.pdf>>, In 4th Biennial Conference on Innovative Data Systems Research (CIDR), Jan. 4, 2009, 10 pages.
"MemSQL Indexes", Retrieved Feb. 21, 2013 at <<http://developers.memsql.com/docs/1b/indexes.html>>, MemSQL documentation, Feb. 21, 2013, 1 page.
Mohan, et al., "ARIES/IM: An Efficient and High Concurrency Index Management Method Using Write-Ahead Logging", Retrieved Feb. 21, 2013 at <<http://www.ics.uci.edu/~cs223/papers/p371-mohan.pdf>>, In Proceedings of the ACM SIGMOD International Conference on Management of Data, vol. 21, Issue 2, Jun. 2, 1992, pp. 371-380.
"MongoDB", Retrieved May 10, 2012 at <<http://www.mongodb.org>>. 1 page.
O'Neil, et al., "The Log-Structured Merge-Tree (LSM-Tree)", Retrieved Feb. 22, 2013 at <<http://citeseerx.ist.psu.edu/viewdoc/download?doi=10.1.1.44.2782&rep=rep1&type=pdf>>, In Acta Informatica, vol. 33, Issue 4, Jun. 1996, 32 pages.
O'Neil, et al., "The LRU-K Page Replacement Algorithm for Database Disk Buffering", Retrieved Feb. 22, 2013 at <<http://www-2.cs.cmu.edu/~christos/courses/721-resources/p297-o_neil.pdf>>, In Proceedings of the ACM SIGMOD International Conference on Management of Data (SIGMOD), Jun. 1, 1993, pp. 297-306.
Pandis, et al., "PLP: Page Latch-free Shared-everything OLTP", Retrieved Feb. 22, 2013 at <<http://www.vldb.org/pvldb/vol4/p610-pandis.pdf>>, In Proceedings of the Very Large Data Bases Endowment, vol. 4, Issue 10, Aug. 29, 2011, pp. 610-621.
"Project Voldermont", Retrieved Feb. 21, 2013 at <<http://www.project-voldemort.com/voldemort/>>, Project Voldermont, Feb. 21, 2013, 1 page.
Rosenblum, et al., "The Design and Implementation of a Log-Structured File System", ACM Transactions on Computer Systems, vol. 10, No. 1, Feb. 1992, pp. 26-52.
Sewall, et al., "PALM: Parallel Architecture-Friendly Latch-Free Modifications to B+ Trees on Many-Core Processors", Retrieved

(56) References Cited

OTHER PUBLICATIONS

Feb. 22, 2013 at <<http://pcl.intel-research.net/publications/palm.pdf>>, In Proceedings of the Very Large Data Bases Endowment, vol. 4, No. 11, Aug. 29, 2011, 12 pages.
Thomson, et al., "Calvin: Fast Distributed Transactions for Partitioned Database Systems", Retrieved Feb. 22, 2013 at <<http://cs.yale.edu/homes/thomson/publications/calvin-sigmod12.pdf>>, In Proceedings of the ACM SIGMOD International Conference on Management of Data (SIGMOD '12), May 20, 2012, 12 pages.
"Wikipedia: (CRUD)", Retrieved Feb. 22, 2013 at <<http://en.wikipedia.org/wiki/Create,_read,_update_and_delete>>, Wikipedia, Feb. 22, 2013, 2 pages.
"Xbox Live", Retrieved Feb. 22, 2013 at <<http://www.xbox.com/live>>, Xbox.com, Feb. 22, 2013, 3 pages.
Ewbank, Kay, "A Better B-Tree in Hekaton", Retrieved Feb. 21, 2013 at <<http://www.i-programmer.info/news/84/5239.html>>, I Programmer, Dec. 24, 2012, 4 pages.
Graefe, Goetz, "Write-Optimized B-Trees", Retrieved Feb. 21, 2013 at <<http://www.vldb.org/conf/2004/RS18P2.PDF>>, In Proceedings of the Thirtieth international Conference on Very Large Data Bases (VLDB), vol. 40, Aug. 31, 2004, pp. 672-683.
Kissinger, et al., "KISS-Tree: Smart Latch-Free In-Memory Indexing on Modern Architectures", Retrieved Feb. 21, 2013 at <<http://fusion.hpl.hp.com/damon2012/proceedings/damon12-p16.pdf>>, In Proceedings of the Eighth International Workshop on Data Management on New Hardware (DaMoN 2012), May 21, 2012, pp. 16-23.
Cha, et al., "Cache-Conscious Concurrency Control of Main-Memory Indexes on Shared-Memory Multiprocessor Systems", Retrieved Feb. 21, 2013 at <<http://www.dia.uniroma3.it/~vldbproc/022_181.pdf>>, In Proceedings of the 27th International Conference on Very Large Data Bases (VLDB), Sep. 11, 2001, 10 pages.
Pandis, Ippokratis, "Scalable Transaction Processing through Data-oriented Execution", Retrieved Feb. 21, 2013 at <<http://www.ece.cmu.edu/research/publications/2012/CMU-ECE-2012-009.pdf>>, Submitted in Partial Fulfillment of the Requirements for the Degree of Doctor of Philosophy in Electrical and Computer Engineering, Carnegie Mellon University, May 2011, 227 pages.
Kissinger, et al., "QPPT: Query Processing on Prefix Trees", Retrieved Feb. 21, 2013 at <<http://www.cidrdb.org/cidr2013/Papers/CIDR13_Paper3.pdf>>, In Proceedings of 6th Biennial Conference on Innovative Data Systems Research (CIDR'13), Jan. 6, 2013, 11 pages.

Lomet, et al., "Structuring Storage Based on Latch-Free B-Trees", U.S. Appl. No. 13/527,880, filed Jun. 20, 2012, 65 pages.
Sears, et al., "bLSM: A General Purpose Log Structured Merge Tree," Proceedings of the 2012 ACM SIGMOD International Conference on Management of Data (SIGMOD '12), May 20, 2012, pp. 217-228.
Comer, Douglas, "The Ubiquitous B-Tree," Computing Surveys, vol. II, No. 2, Jun. 1979, pp. 121-137.
"NoSQL," Retrieved Sep. 18, 2013 at <<http://en.wikipedia.org/wiki/NoSQL>>, Wikipedia, Sep. 18, 2013, 8 pages.
"OpenVMS Record Management Services Reference Manual," Retrieved Sep. 18, 2013 at <<http://www.itec.suny.edu/scsys/vms/vmsdoc/72final/4523/4523pro.html#introduction_to_vms_rms>>, Compaq Computer Corporation, 1999, 9 pages.
Johnson, et al., "Scalability of write-ahead logging on multicore and multisocket hardware," Retrieved May 11, 2012 at <<http://infoscience.epft.ch/record/170505/files/aether-smpfulltexl.pdf>> , In Proceedings of the VLDB Endowment (VLDB '12), Dec. 2011, pp. 239-263.
Holloway, Allison L., "Adapting Database Storage for New Hardware," Retrieved May 11, 2012 at <<http://pages.cs.wisc.edu/-ahollowa/main.pdf>> , University of Wisconsin at Madison, Madison, WI, 2009, 146 pages.
Athanassoulis, et al., "MaSM: Efficient Online Updates in Data Warehouses," Retrieved May 11, 2012 at <<http://www.cs.cmu.edu/afs/cs.cmu.edu/Web/People/chensm/papers/MaSM-sigmod11.pdf>> , In Proceedings of the 2011 International Conference on Management of Data (SIGMOD '11), Jun. 2011, pp. 865-876.
"International Search Report and Written Opinion" Issued in PCT Application No. PCT/US2015/041046, Mailed Date: Nov. 9, 2015, 14 Pages.
Antonopoulos, et al., "Efficient Updates for Web-Scale Indexes Over the Cloud", In Proceedings of the 28th International Conference on Data Engineering Workshops, Apr. 1, 2012, pp. 135-142.
Levandoski, Justin, "Ranking and New Database Architectures", In Proceedings of the 7th International Workshop on Ranking in Databases, Article No. 5, Aug. 30, 2013, 4 Pages.
"International Search Report and Written Opinion Issued in PCT Application No. PCT/US2015/054350", Mailed Date: Feb. 5, 2016, 9 Pages., 9 Pages.
March, et al., "A Read-Only Distributed Hash Table", In Journal of Grid Computing, vol. 9, Issue 4, Apr. 27, 2011, pp. 501-529.
Demand filed May 11, 2016 , in response to "International Search Report and Written Opinion Issued in PCT Application No. PCT/US2015/054350", Mailed Date: Feb. 5, 2016.

* cited by examiner

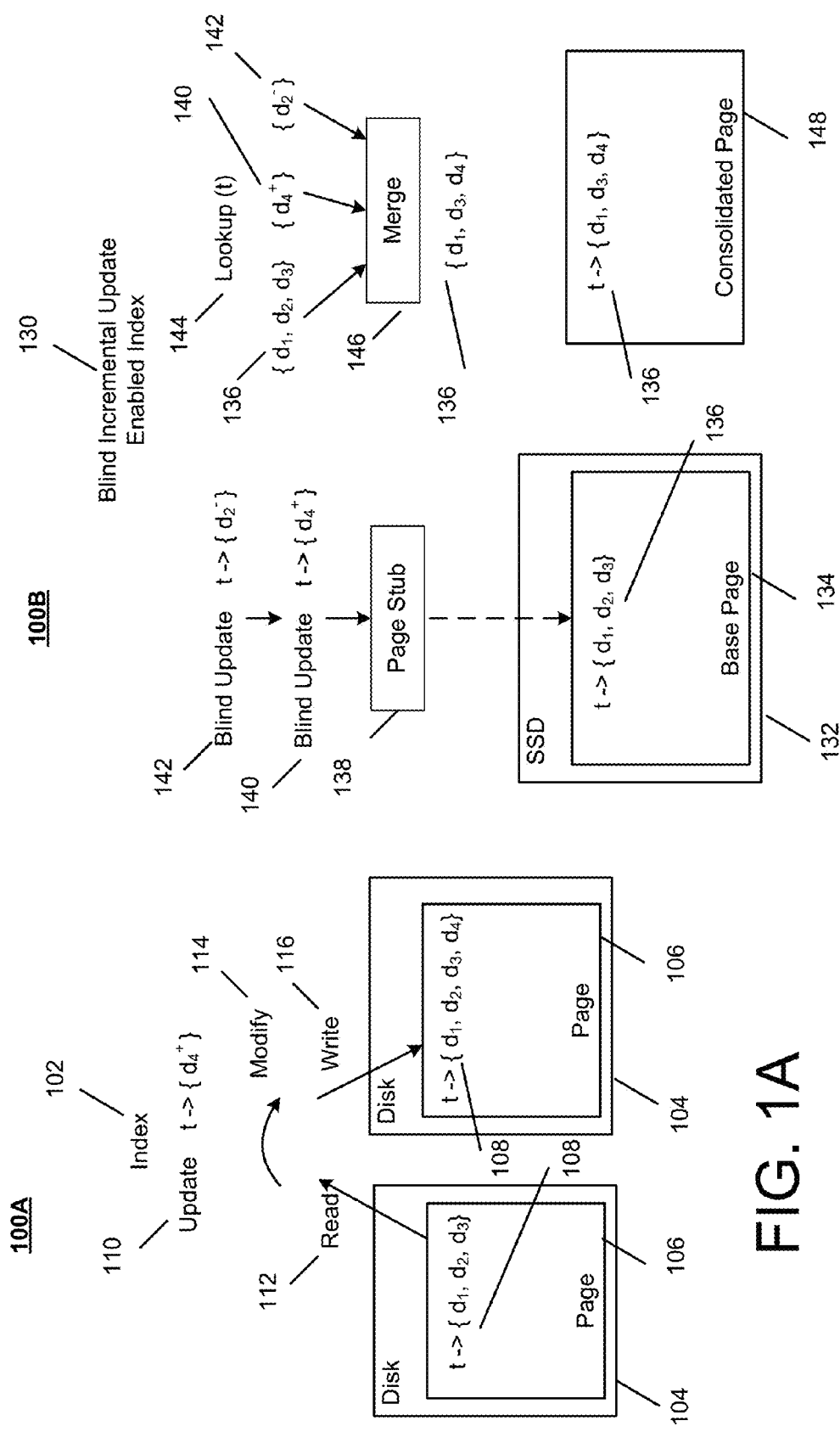

HIGH THROUGHPUT DATA MODIFICATIONS USING BLIND UPDATE OPERATIONS

BACKGROUND

Users of electronic devices frequently need to access database systems to obtain various types of information. Many different techniques have been devised for storage and retrieval of data items. For example, some recent hardware platforms have exploited recent hardware developments such as multi-core processors, multi-tiered memory hierarchies, and secondary storage devices such as flash, in an effort to provide higher performance.

SUMMARY

According to one general aspect, a system may include an apparatus that includes a computer-readable storage medium storing executable instructions, the executable instructions including a page update manager that includes an update acquisition module that obtains update requests that specify updates for a logical page associated with a key-value store. An update posting engine posts the updates using the obtained update requests, without accessing the logical page via a read operation.

According to another aspect, update requests that specify incremental updates to a key in a key-value store that is associated with a logical page may be obtained. The key may be incrementally updated using the obtained update requests, without accessing the logical page via a read operation.

According to another aspect, a computer program product including a computer-readable storage medium stores executable instructions that cause at least one data processing apparatus to obtain a plurality of update requests that specify updates to a logical page associated with a key-value store, and post the updates using the obtained plurality of update requests, without accessing the logical page via a read operation as part of the posting of the obtained updates to the key.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. The details of one or more implementations are set forth in the accompanying drawings and the description below. Other features will be apparent from the description and drawings, and from the claims.

DRAWINGS

FIGS. 1A-1C depict example update operations.

DETAILED DESCRIPTION

I. Introduction

Figure 1C:
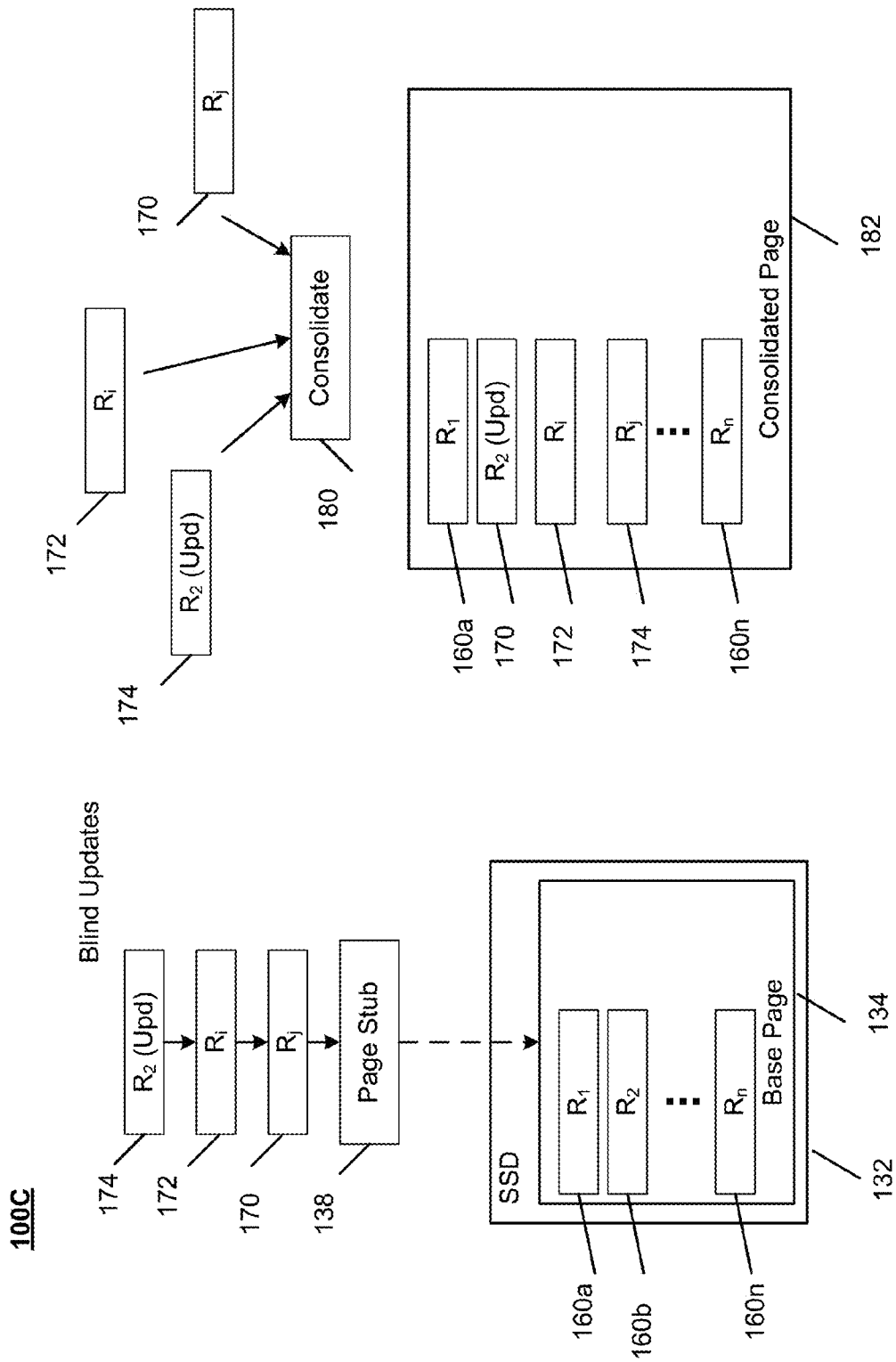

Recent developments in hardware platforms have exploited multi-core processors, multi-tiered memory hierarchies, and secondary storage devices such as flash, in an effort to provide higher performance. For example, central processing unit (CPU) changes have included multi-core processors and main memory access that involves multiple levels of caching. For example, flash storage, and hard disk vendor recognition that update-in-place compromises capacity, has led to increased use of log structuring. For example, cloud data centers increase system scale, and the use of commodity hardware puts increased emphasis on high availability techniques.

Many indexing applications may need to sustain rapid writes with high throughput. For such applications, the read input/output (I/O) that is needed before a write (to lookup the existing value of the key) may be a bottleneck for index insertion throughput. There is a broad category of applications (e.g., inverted index) where the value associated with a key may be updated without knowledge of the existing value (e.g., adding a new document identifier (id) to the posting list for a term). For such applications, the update need not involve a read I/O, but the underlying key-value store may not support such an optimization. In accordance with example techniques discussed herein, a mechanism for "blind" incremental updates (no read needed to perform a write operation) may be used within the framework of a generic key-value store without making any assumptions about the higher level application. Together with the log-structured storage organization of an example key-value store, as discussed herein, key updates may be sustained at a throughput that may approach sequential storage write bandwidth.

In accordance with example techniques discussed herein, a mechanism for "blind" updates (no read needed to perform a write operation) to records included in logical pages associated with example key-value stores, is also provided.

In this context, a "key-value store" may generally refer to a form of database management system that may store pairs of respective keys (or terms) and values, as well as retrieve values when a respective key is known. For example, a key-value store may include terms (e.g., keys) with respective lists of objects associated with the respective terms. For example, a key-value store may store indexes that include respective lists of document identifiers that are associated with respective terms.

For example, in an inverted index environment (e.g., LUCENE), a common approach is "segmented index". Segment indexes are written one-by-one as documents arrive. Though such writes avoid reads, they may complicate the query serving pathway. For example, queries may scan multiple segment indexes, and hence a user may make a tradeoff between query time and freshness of results.

In this context, an "inverted index" may generally refer to an index data structure storing a mapping from content (e.g., words or numbers) to its locations in a database file, or in a document or a set of documents. For example, an inverted index may be used to enable fast full text searches, at a cost of increased processing when a document is added to the database. For example, an inverted index may include a record level inverted index (e.g., an inverted file index or inverted file) that stores a list of references to documents for each word, or a word level inverted index (e.g., a full inverted index or inverted list) that may additionally store the positions words within a document.

For example, in a generic key-value store environment (e.g., the Log-Structured Merge Tree (LSM-tree)), there may be no support for semantic value merge. Hence, a read I/O is involved to perform a write, and this may slow the speed of index insertions.

In accordance with example techniques discussed herein, a slim page stub may be held in memory for an index page that resides on storage (e.g., disk or flash). This page stub stores information that aids in locating the rest of the page on secondary storage (e.g., storing location information indicating locations where the rest of the page resides). For example, it may also store some access method specific information. For example, it may store key boundaries associated with the index page (e.g., minimum and maximum key values of indexes associated with the index page). Thus, for example, when a blind update is performed, the stub may provide information that aids in determining that a particular key belongs with a particular page (or not). For example, if a page is split during processing, the stub has information regarding the boundaries.

In this context, a "page" may refer to an object in storage, which may be accessed via a physical storage address. As used herein, a "page" may be associated with a flexible size, and may represent a page unit of storage that may be distributed over multiple discontiguously stored segments of storage. The storage may include volatile and/or stable storage.

In this context, a "logical page" may include a base page and zero or more delta records indicating updates to the page, thus allowing a page to be written to flash in pieces when it is flushed. Thus, a logical page on flash may correspond to records potentially on different physical device blocks that are linked together, e.g., using file offsets as pointers. Further, a physical block may include records from multiple logical pages. Further, a logical page may refer to locations that store related information.

In accordance with example techniques discussed herein, when an incremental update arrives for a key on the page, this may be appended as a "delta record" to the page (e.g., by linking to the existing page stub). A read I/O may not be needed, as the page stub is sufficient for the update to succeed.

In accordance with example techniques discussed herein, these delta records may eventually be flushed to storage using "incremental page flushing," wherein unflushed portions of a page are copied to a substantially large flush buffer which may be appended to the end of the "data log" on storage using a single write I/O (e.g., using LLAMA), hence utilizing full storage write bandwidth.

In this context, a "flush" operation may refer to transferring a page from main memory (e.g., cache storage) to secondary storage by way of copying the page to an output buffer.

In accordance with example techniques discussed herein, on the lookup (query) pathway, where read I/Os may be acceptable, the full page may be read in from storage and the different fragments of the value of a key may be provided to a "user-defined merge function" to obtain the final value; the user-defined nature of the merge function may allow the key-value store to remain generic without any application knowledge (e.g., the key-value store may be "opaque" to the application and vice versa). For example, a particular user may use a particular technique for storing and maintaining the key-value store, and the "user-defined merge function" may be used via an invocation of the user's function, to perform the merge operation in accordance with the user's particular storage/maintenance techniques.

In accordance with example techniques discussed herein, a mechanism may be exposed to perform incremental updates to key values.

In accordance with example techniques discussed herein, a need to perform read I/O before such an incremental update may advantageously be avoided (or substantially avoided) by appending information describing the update to a page stub existing in memory.

In accordance with example techniques discussed herein, incremental flushing of a page storing such key value updates into a large flush buffer that is appended to storage may be performed, for example, using a single write I/O.

In accordance with example techniques discussed herein, a user-defined merge function may be exposed that is utilized to merge multiple incremental updates to a key value to obtain the final value that is returned on the query pathway.

FIGS. 1A-1C depict example update operations on indexes. As shown in FIG. 1A, an index 102 may be used on a disk 104 that stores a page 106. As shown in FIG. 1A, a term index t 108 may initially store values (e.g., document identifiers, or document ids) representing three documents $d_1$, $d_2$, and $d_3$. An update request 110, requesting an addition of a document id $d_4$, to the term index t 108, may be received for processing. A read operation 112 may be performed to read the page 106, so that a modify operation 114 may be performed to add $d_4$ to the term index t 108. A write operation 116 may then be performed to write the page 106 to the disk 104, with the updated term index t 108.

As shown in FIG. 1B, and in accordance with example techniques discussed herein, a blind incremental update enabled index 130 may be used on a solid state device (SSD) 132 that stores a base page 134. As shown in FIG. 1B, a term index t 136 may initially store values (e.g., document identifiers, or document ids) representing three documents $d_1$, $d_2$, and $d_3$. As shown in FIG. 1B, a page stub 138 may be used for attaching requested blind incremental updates to the term index t 136 (without reading the base page 134), until they may be further processed. For example, the page stub 138 may be prepended to the base page 134. A first blind update request 140, requesting an addition of a document id $d_4$, to the term index t 136, may be received for processing. The blind update request 140 may be prepended to the page stub 138, thus updating a current state of the page stub 138 to include the blind update request 140, for the term index t 136 of the base page 134. Thus, the update to the term index t 136 may be performed without reading the "old" base page.

As shown in FIG. 1B, a second blind update request 142, requesting a deletion of a document id $d_2$, from the term index t 136, may be received for processing. The blind update request 142 may be prepended to the page stub 138, thus updating a current state of the page stub 138 to include the blind update request 142 (as well as the blind update request 140), for the term index t 136 of the base page 134.

A lookup 144 may be performed on the term index t 136, which may result in at least a portion of the base page 134 (i.e., at least the term index t 136, and the page stub 138) being read into memory. A merge operation 146 may be performed to process the first blind update request 140 and the second blind update request 142, thus adding $d_4$ to the term index t 136, and deleting $d_2$ from the term index t 136, for use with a consolidated page 148 (from the base page 134). For example, the merge operation 146 may be performed via the "user-defined merge function" as discussed above, to obtain the final value.

While FIGS. 1A and 1B show only a single page stored in a storage device, one skilled in the art of data processing will understand that many pages may be stored in various storage devices, without departing from the spirit of the discussion herein.

As shown in FIG. 1C, and in accordance with example techniques discussed herein, blind updates may be performed in association with the solid state device (SSD) 132 that stores the base page 134. As shown in FIG. 1C, the base page 134 may include multiple records 160a, 160b, 160c that may be updated. For example, an UPSERT operation may insert a record if it is not already present, and may replace a record with an updated version of the record if it is present (e.g., via "whole record" updates to the base page 134). In accordance with example techniques discussed herein, a page stub 138 may be used for attaching requested blind updates 170, 172, and 174 to the records in the base page 134 (without reading the base page 134), until they may be further processed.

For example, the page stub 138 may be prepended to the base page 134. A first blind update request 170, requesting an addition of a record $R_j$, to the base page 134, may be received for processing. The blind update request 170 may be prepended to the page stub 138, thus updating a current state of the page stub 138 to include the blind update request 170, for the page 134.

As shown in FIG. 1C, a second blind update request 172, requesting addition of a record $R_i$, to the logical page that includes the base page 134 and prior update request 170, may be received for processing. The blind update request 172 may be prepended to the page stub 138, thus updating a current state of the page stub 138 to include the blind update request 172 (as well as the blind update request 170), for the base page 134.

As shown in FIG. 1C, a third blind update request 174, requesting addition/update of a record $R_2$ (e.g., which may include a replacement of already-existing record $R_2$), with regard to the logical page that includes base page 134 and prior update requests 170 and 172, may be received for processing. The blind update request 174 may be prepended to the page stub 138 and prior update requests 170 and 172, thus updating a current state of the page stub 138 to include the blind update request 174 (as well as the blind update requests 170, 172), for the base page 134.

A consolidate operation 180 may be performed on the blind updates 170, 172, 174 with the base page 134, which may result in at least a portion of the base page 134 being read into memory. The consolidate operation 180 may be performed to consolidate the blind updates 170, 172, 174 with the base page 134 to generate a consolidated page 182 (from the base page 134). For example, the consolidation operation 180 may be performed via a "user-defined consolidation operation" as discussed herein, to obtain the final value.

While FIG. 1C shows only a few pages stored in a storage device, one skilled in the art of data processing will understand that many pages may be stored in various storage devices, without departing from the spirit of the discussion herein.

For example, BW-TREEs and LLAMA techniques (discussed further below) may be used for inverted index applications, to provide sustained throughput for index inserts/updates. For example, a log-structured store design used with BW-TREEs and LLAMA techniques may utilize full storage throughput for writes. However, index inserts/updates may involve page reads, and such reads may interfere with delivery of sustained write throughput, particularly on hard disk.

Such interfering reads may originate at two levels:

(1) Application layer: Processing a batch of documents may involve updating the posting lists for the associated terms. Such updating may be performed by performing a read on the key (term) to obtain the current posting list, updating the current posting list with new document IDs, and then performing an update (or insert) on the key into the index.

(2) BW-TREE layer: For example, a BW-TREE may provide Structured Query Language (SQL)-like semantics (see, e.g., commonly owned U.S. patent application Ser. No. 13/527,880, entitled "Structuring Storage Based on Latch-Free B-Trees," with inventors David Lomet et al., filed Jun. 20, 2012, and J. Levandoski, et al., "The BW-TREE: A B-tree for New Hardware Platforms," 29th *IEEE International Conference on Data Engineering* (ICDE 2013), Apr. 8-11, 2013). Hence, an insert performs a lookup on the key and returns error if it is already present. An update performs a lookup on the key and returns error if it is not present.

The above two sources of reads during index updates may interfere with sustained index insert/update throughput for a database application. Such sources of reads during index updates may be avoided (or substantially avoided) as follows:

For level (1): The index may support incremental updates to keys that do not require reading the key before updating it. At the application layer, this may involve performing an incremental update to the posting list of the term by specifying only the doc IDs to be added to (or deleted from) the posting list. This may advantageously avoid issuance of a read on the key (term) before an insert/update.

For level (2): The index may advantageously avoid SQL-like insert/update semantics, instead posting a delta record on the page that describes the incremental update to the key. Thus, an insert/update may not involve reading the whole page.

The user layer (e.g., application indexing layer) may also provide a callback function (f) (e.g., the "user-defined merge function" as discussed above) that computes a final posting list representation by combining a base posting list representation with a sequence of incremental updates to the key (term). On the query pathway, the entire page may be read in and all the fragments for values of the key may be provided to the merge function to compute a final value for that key (posting list representation), that may be returned to the user layer.

Blind writes (i.e., updates that do not involve the reading of a prior version) may advantageously include avoidance of reading the prior version, and the possibility of concurrent updates at the transactional component (TC), as discussed further below. Example techniques for handling blind writes and the aggregate objects to which they are applied are discussed below.

In accordance with example techniques discussed herein, an example system that may be referred to herein as LLAMA (Latch-free, Log-structured Access Method Aware), includes a caching and storage subsystem for (at least) recently developed hardware environments (e.g., flash, multi-core), although one skilled in the art of data processing will understand that such example techniques are not limited only to recently developed hardware.

For example, LLAMA may support an application programming interface (API) for arbitrarily selected page-oriented access methods that provides both cache and storage management, optimizing processor caches and secondary storage. For example, caching (CL) and storage (SL) layers may use a common mapping table that separates a page's logical and physical location. For example, the cache layer (CL) may support data updates and management updates (e.g., for index re-organization) via latch-free compare-and-swap atomic state changes on its mapping table.

For example, the storage layer (SL) may use the same mapping table to handle the page location changes produced by log structuring on every page flush. For example, a latch-free BW-TREE implementation (e.g., an implementation using a BW-TREE, as an example of an ordered B-tree style index) may be used. In this context, "latch-free" may refer to allowing concurrent access to pages by multiple threads.

Example techniques discussed herein may provide mapping tables that may virtualize both the location and the size of pages. For example, such virtualization may be utilized for both main memory designs and stable storage designs (e.g., log structured storage designs), as discussed further herein.

Example techniques discussed herein may separate an access method layer from cache/storage management. As an example, techniques discussed herein may be used to enforce a write-ahead log protocol. For example, before flushing a page, a conventional database kernel may check a page log sequence number (LSN) to determine whether there are updates that are not yet stable in the transactional log. For example, LLAMA cache management may exploit example delta updates to "swap out" a partial page. For example, it can drop from the cache the part of the page already present on secondary storage (which does not include recent delta updates). For example, the access method layer may be regularly flushing for transactional log checkpointing. Thus, the cache manager will find sufficient candidate (possibly partial) pages to satisfy any buffer size constraint.

Example techniques discussed herein may provide a framework that enables a substantial number of access methods (i.e., not just a single instance) to exploit these techniques by implementing a subsystem layer that provides them. Further, a log structured store may be implemented for writing data to secondary storage that provides advantageous efficiency. Hence, an access method may focus on the main memory aspects of its index, and example techniques discussed herein may provide the framework for achieving performance metrics similar to performance metrics of the BW-TREE.

For example, a technique such as LLAMA, through its API, may provide latch-free page updating, which is accomplished in main memory via a compare and swap (CAS) atomic operation on the mapping table.

For example, in managing the cache, a technique such as LLAMA may reclaim main memory by dropping only previously flushed portions of pages from memory, thus not involving any input/output (I/O) operations, even when swapping out "dirty" pages. Thus, a technique such as LLAMA may be able to control its buffer cache memory size without input from its access method user.

For example, for effective management of secondary storage, a technique such as LLAMA may utilize log-structuring. For example, a technique such as LLAMA may improve performance compared with conventional log structuring by using partial page flushes and pages with substantially no empty space—i.e., substantially 100% storage utilization. These may reduce the number of input/output operations (I/Os) and amount of storage consumed per page when a page is flushed, and hence may reduce the write amplification that may be experienced when log-structuring is used. Further, all storage related operations may be completely latch-free.

For example, a technique such as LLAMA may provide (at least) a limited form of system transaction. In this sense, system transactions are not user level transactions, but rather, exploiting the log-structured store, provide atomicity purely for the "private use" of the access method (e.g., for index structure modifications (SMOs)). For example, this may enable indexes to adapt as they grow while concurrent updating continues.

For example, the BW-TREE structure may include a type of latch-free B-tree structure. For example, updates to BW-TREE nodes may be performed based on prepending update deltas to a prior page state. Thus, the BW-TREE may be latch-free, as it may allow concurrent access to pages by multiple threads. Because such delta updating preserves the prior state of a page, it may provide improved processor cache performance as well.

Figure 2:
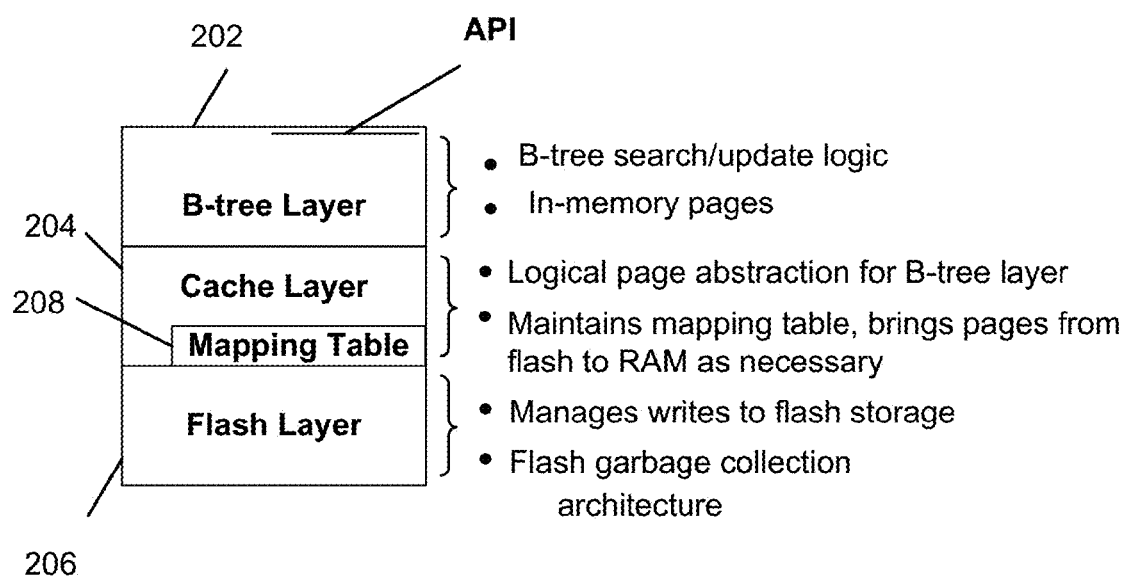
FIG. 2 is a block diagram of an example B-tree atomic record store architecture.

FIG. 2 is a block diagram 200 of an example B-tree atomic record store architecture (e.g., an example BW-TREE architecture). An access method layer, or a B-tree Layer 202, is the top layer, as shown in FIG. 2. The B-tree Layer 202 interacts with a Cache Layer 204, which is the middle layer. An example cache manager may be built on top of a Storage Layer 206, which may support an example log structured flash store. According to example embodiments discussed herein, a log structured store may manage both flash and disk storage. An example mapping table 208 may be included in the cache layer 204.

Example techniques using BW-TREEs may further provide page splitting techniques that are also latch-free, and that may employ B-link tree style side pointers. Splits (and other structure modification operations) may be atomic both within main memory and when made stable. For example, atomic record stores may be implemented based on a BW-TREE architecture.

One skilled in the art of data processing will appreciate that there may be many ways to accomplish the latch-free and log-structured storage discussed herein, without departing from the spirit of the discussion herein.

At the LLAMA layer (see, e.g., commonly owned U.S. patent application Ser. No. 13/924,567, entitled "Latch-Free, Log-Structured Storage for Multiple Access Methods," with inventors David Lomet et al., filed Jun. 22, 2013, and Levandoski et al., "LLAMA: A Cache/Storage Subsystem for Modern Hardware," *Proceedings of the VLDB Endowment*, Vol. 6, No. 10 (39th International Conference on Very Large Databases, Aug. 26, 2013), the page is the abstraction that is manipulated. To support blind writes, LLAMA may enable pages to be updated regardless of whether they are in the cache or in stable storage.

In accordance with example techniques discussed herein, an example update interface may support (at least) a delta update (UPDATE-D) and a replacement update (UPDATE-R) (e.g., when the entire page is available in cache).

In accordance with example techniques discussed herein, LLAMA may advantageously support partial pages, including partial page swap-outs.

Figure 3:
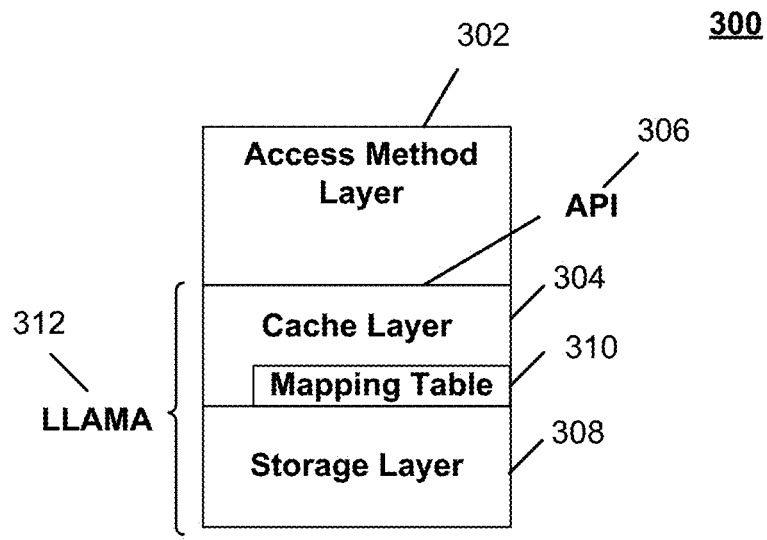
FIG. 3 illustrates an example architectural layering for access methods for cache/storage layers.

FIG. 3 illustrates an example architectural layering for access methods for cache/storage layers. An access method layer 302 is the top layer, as shown in FIG. 3. The access method layer 302 interacts with a Cache Layer 304, which is the middle layer. An application programming interface (API) 306 may be used for activities between the access method layer 302 and the Cache Layer 304. An example storage layer 308 may interact with a mapping table 310, which may be shared between the cache layer 304 and the storage layer 308. For example, LLAMA 312 includes the cache layer 304 and the storage layer 308. For example, a storage layer may support a log structured flash store. In accordance with example techniques discussed herein, a log structured store may manage both flash and disk storage. For example, this design may be suitable as a standalone or DEUTERONOMY style atomic record store (ARS).

Figure 4:
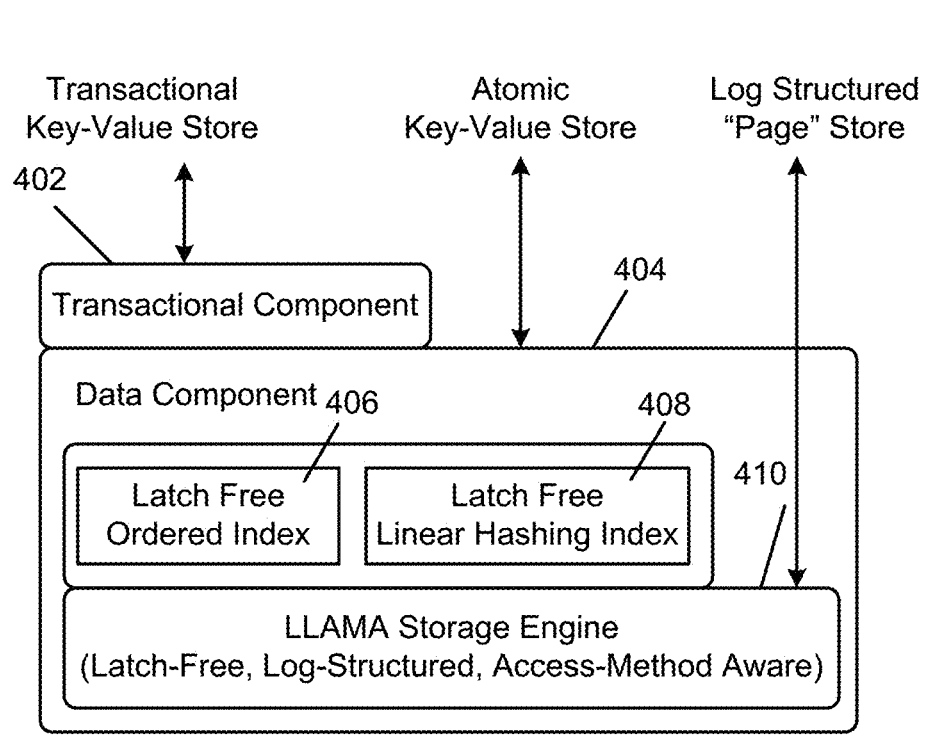
FIG. 4 is a block diagram of an example architecture for latch-free, log-structured storage for multiple access methods.

For example, a technique such as LLAMA may support a page abstraction, supporting access method implementations for cache/storage layers. Further, a transactional component (e.g., a DEUTERONOMY-style transactional component) may be added on top. FIG. 4 is a block diagram of an example architecture for latch-free, log-structured storage for multiple access methods. As shown in FIG. 4, a transactional component 402 may support a transactional key-value store, and may operate with a data component 404 that may include an atomic key-value store. As shown in FIG. 4, the data component 404 may include a latch-free ordered index 406 and/or a latch free linear hashing index 408. As shown in FIG. 4, the data component 404 may further include an example latch-free, log-structured, access-method aware (LLAMA) storage engine 410 (e.g., LLAMA 312 of FIG. 3).

The example API 306 may be "data opaque," meaning that the example LLAMA implementation does not "see" (e.g., does not examine, or analyze, or depend on) what the access method (e.g., of the access method layer 302) is putting into pages or delta records, and acts independently of what is provided in the pages or delta records by the access method. Thus, example LLAMA implementations may act in response to specific operations where the access method has selected the page upon which to operate, and the operation that LLAMA performs is not dependent on the data arguments that are provided.

Figure 5:
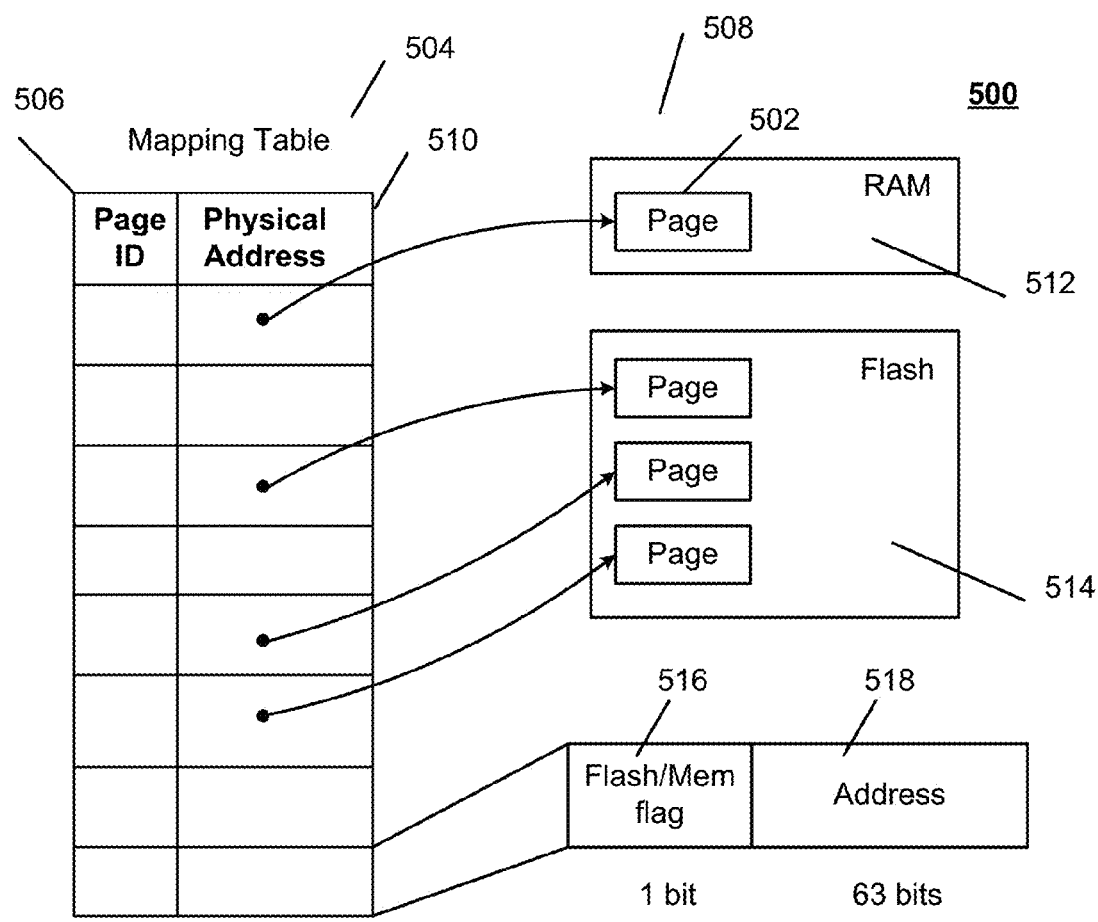
FIG. 5 illustrates an example mapping table.

As shown in FIG. 5, a page 502 may be accessed via a mapping table 504 that maps page identifiers (PIDs) 506 to states 508 (e.g., via a "physical address" 510 stored in the mapping table 504), either in main memory cache 512 or on secondary storage 514. For example, the main memory cache 512 may include random access memory (RAM). For example, the secondary storage 514 may include flash memory. For example, pages 502 may be read from secondary storage 514 into a main memory cache 512 on demand, they can be flushed to secondary storage 514, and they may be updated to change page state while in the cache 512. For example, substantially all page state changes (both data state and management state) may be provided as atomic operations, in accordance with example techniques discussed herein. As shown in FIG. 5, an example physical address 510 may include a flash/memory flag 516 (e.g., for 1 bit, as shown in the example) indicating whether the physical address is associated with flash or memory (e.g., cache) storage, with an address field 518 for (at least) the address itself (e.g., for 63 bits, as shown in the example). One skilled in the art of data processing will appreciate that there are many ways of representing a "physical address" (e.g., other than a 64-bit representation), without departing from the spirit of the discussion herein.

In accordance with example techniques discussed herein, LLAMA, through its API, may provide latch-free page updating via a compare and swap (CAS) atomic operation on the mapping table 504 (e.g., in lieu of a conventional latch that guards a page from concurrent access by blocking threads). For example, the CAS strategy may advantageously increase processor utilization and improve multi-core scaling.

In accordance with example techniques discussed herein, in managing the cache, LLAMA may reclaim main memory by dropping only previously flushed portions of pages from memory, thus not using any I/O, even when swapping out "dirty" pages. Thus, an example architecture such as LLAMA may control its buffer cache memory size without a need to examine data stored in pages by its access method user (e.g., as an example architecture such as LLAMA is unaware of transactions and write-ahead logging).

An example architecture such as LLAMA may use log-structuring to manage secondary storage (e.g., providing the advantages of avoiding random writes, reducing the number of writes via large multi-page buffers, and wear leveling involved with flash memory). Further, an example architecture such as LLAMA may advantageously improve performance (e.g., as compared with conventional log structuring) with partial page flushes and pages with substantially no empty space—i.e., substantially 100% utilization. For example, these may reduce the number of I/Os and storage consumed per page when a page is flushed, and hence may reduce the write amplification that may otherwise be encountered when log-structuring is used. Further, substantially all storage related operations may be completely latch-free.

Additionally, an example architecture such as LLAMA may support (at least) a limited form of system transaction (see, e.g., D. Lomet et al., "Unbundling Transaction Services in the Cloud," *Conference on Innovative Data Systems Research* (CIDR), 2009, with regard to system transactions). For example, system transactions may not be user transactions, but rather may provide atomicity purely for the "private use" of the access method (e.g., for index structure modifications (SMOs)—see, e.g., C. Mohan et al., "ARIES/IM: An Efficient and High Concurrency Index Management Method Using Write-Ahead Logging," *In Proceedings of the 1992 ACM SIGMOD International Conference on Management of Data* (SIGMOD '92), 1992, pp. 371-380). For example, a property that system transactions recorded separately from the transaction log may be effective is an example of an advantageous insight of the DEUTERONOMY approach to decomposing a database kernel.

In designing an example system such as LLAMA, a design goal may include a goal to be as "general purpose" as possible, which may sometimes lead to a goal to "be as low level" as possible. However, for an example system such as LLAMA to be "general purpose," it may be desirable to operate effectively while knowing as little as possible about what an access method does in using its facilities. Thus, operations of an example system such as LLAMA may be "primitive," targeted at cache management and the updating of pages. For example, an example system such as LLAMA may include some additional facilities to support a primitive transaction mechanism that may be advantageously included for SMOs (e.g., page splits and merges).

In accordance with example techniques discussed herein, an example system such as LLAMA may include nothing in the interface regarding log sequence numbers (LSNs), write-ahead logging or checkpoints for transaction logs. In accordance with example techniques discussed herein, an example system such as LLAMA may include no idempotence test for user operations. Further, in accordance with example techniques discussed herein, an example system such as LLAMA may include no transactional recovery (e.g., which may be handled by an access method using an example system such as LLAMA, in accordance with example techniques discussed herein).

An example access method may change state in response to user operations. For example, a user may want to create (C), read (R), update (U), or delete (D) a record (e.g., CRUD operations). In accordance with example techniques discussed herein, an example system such as LLAMA may not directly support these operations. Rather, the example access method may implement them as updates to the states of LLAMA pages.

For example, there may also be structure changes that are part of example access method operations. For example, a BW-TREE page split may involve posting a split delta to an original page O so that searchers know that a new page now contains data for a sub range of the keys in O. For example, these too may be handled as updates to a LLAMA page O.

In accordance with example techniques discussed herein, an example system such as LLAMA may support two forms of update, e.g., a delta update, and a replacement update. For example, an access method may choose to exploit these forms of updates in accordance with a user's wishes. For example, a BW-TREE may make a series of delta updates and at some point decide to "consolidate" and optimize the page by applying the delta updates to a base page. For example, the BW-TREE may then use a replacement update to generate the new base page.

In accordance with example techniques discussed herein, an example system such as LLAMA may retain information regarding the physical location of a page in secondary storage, throughout update operations and replacement operations as discussed herein, so that the system 100 has the secondary storage page location information for re-reading the page should it be swapped out of the main memory cache and for garbage collection, as further discussed herein. Thus, the system 300 may remember previous page locations and stable page state information.

For example, a delta update may be indicated as Update-D(PID, in-ptr, out-ptr, data). For example, the delta update may prepend a delta describing a change to the prior state of the page. For example, for the BW-TREE, the "data" parameter to Update-D may include at least <lsn, key, data> where the lsn enables idempotence. For example, the "in-ptr" points to the prior state of the page, and the "out-ptr" points to the new state of the page.

For example, a replacement update may be indicated as Update-R(PID, in-ptr, out-ptr, data). For example, a replacement update may result in an entirely new state for the page. The prior state, preserved when using an Update-D, may be replaced by the "data" parameter. Thus, the "data" parameter contains the entire state of the page with deltas "folded in."

For example, a "read" may be indicated as Read(PID, out-ptr). For example, a read may return, via "out-ptr," the address in main memory for the page. If the page is not in main memory, then the mapping table entry may contain a secondary storage address. For example, in that case, the page may be read into main memory and the mapping table may be updated with the new main memory address.

In addition to supporting data operations, example systems discussed herein (e.g., LLAMA) may provide operations to manage the existence, location, and persistence of pages. To adjust to the amount of data stored, the access method may add or subtract pages from its managed collections. To provide state persistence, an access method may from time to time flush pages to secondary storage. To manage this persistence, pages may be annotated appropriately (e.g., with log sequence numbers (lsns)). For example, a page manager may be configured to control flush operations, allocate operations, and free operations on pages.

For example, a flush operation may be indicated as Flush(PID, in-ptr, out-ptr, annotation). For example, a Flush may copy a page state into the log structured store (LSS) I/O buffer. Flush may be somewhat similar to Update-D in its impact on main memory, as it prepends a delta (with an annotation) to the prior state. This delta may be tagged as a "flush." In accordance with example techniques discussed herein, an example system such as LLAMA may store the LSS secondary storage address where the page is located (called the flash offset) and the caller "annotation" in the flush delta. For example, a Flush may not ensure a user that the I/O buffer is stable when it returns.

For example, a buffer manager may be configured to control updates to a log-structured secondary storage buffer via latch-free update operations. Thus, for example, multiple threads may simultaneously update the log-structured secondary storage buffer via latch-free operations.

For example, a "make stable" operation may be indicated as Mk_Stable(LSS address). For example, a $Mk_{13}$ Stable operation may ensure that pages flushed to the LSS buffer, up to the LSS address argument, are stable on secondary storage. When Mk_Stable returns, the LSS address provided and all lower LSS addresses are ensured to be stable on secondary storage.

For example, a "high-stable" operation may be indicated as Hi_Stable(out-LSS address). For example, a Hi_Stable operation may return the highest LSS address that is currently stable on secondary storage.

For example, a page manager may be configured to initiate a flush operation of a first page in cache layer storage to a location in secondary storage, based on initiating a copy of a page state of the first page into a secondary storage buffer, and initiating a prepending of a flush delta record to the page state, the flush delta record including a secondary storage address indicating a storage location of the first page in secondary storage and an annotation associated with a caller.

For example, a buffer manager may be configured to initiate a stability operation for determining that pages flushed to a secondary storage buffer, having lower addresses, up to a first secondary storage address argument, are stable in secondary storage.

For example, an "allocate" operation may be indicated as Allocate(out-PID). For example, an Allocate operation may return the PID of a new page allocated in the mapping table. All such pages may be remembered persistently, so Allocate may be included as part of a system transaction (as discussed further below), which may automatically flush its included operations.

For example, a "free" operation may be indicated as Free(PID). For example, a Free operation may make a mapping table entry identified by the PID available for reuse. In main memory, the PID may be placed on the pending free list for PIDs for a current epoch (as discussed further below). Again, because active pages may need to be remembered, Free may be included as a part of a system transaction.

In accordance with example techniques discussed herein, example LLAMA system transactions may be used to provide relative durability and atomicity (all or nothing) for structure modifications (e.g., SMOs). For example, an LSS and its page oriented records may be used as "log records." For example, all operations within a transaction may be automatically flushed to an in-memory LSS I/O buffer, in addition to changing page state in the cache. For example, each LSS entry may include the state of a page, for an example LSS that is strictly a "page" store.

In main memory, all such operations within a transaction may be held in isolation until transaction commit, as discussed further below. For example, at commit, all page changes in the transaction may be flushed atomically to the LSS buffer. For example, on abort, all changes may be discarded. For example, a system transaction manager may be configured to commit transactions and abort transactions.

For example, system transactions may be initiated and terminated via LLAMA supported operations.

For example, a "transaction begin" operation may be indicated as TBegin(out-TID). For example, a transaction identified by a transaction ID (TID) may be initiated. This may involve entering it into an active transaction table (ATT) maintained by the example LLAMA cache layer (CL) manager.

For example, a "transaction commit" operation may be indicated as TCommit(TID). For example, the transaction may be removed from the active transaction table and the transaction may be committed. For example, page state changes in the transaction may be installed in the mapping table and flushed to the LSS buffer.

For example, a "transaction abort" operation may be indicated as TAbort(TID). For example, the transaction may be removed from the active transaction table, changed pages may be reset to "transaction begin" in the cache, and no changes are flushed.

In accordance with example techniques discussed herein, in addition to Allocate and Free, Update-D operations may be permitted within a transaction to change page states. For example, Update-R might not be used, as it may complicate transaction undo, as discussed further below.

In accordance with example techniques discussed herein, transactional operations may all have input parameters: TID and annotation. For example, TID may be added to the deltas in the cache, and an annotation may be added to each page updated in the transaction (e.g., as if it were being flushed). When installed in the flush buffer and committed, all updated pages in the cache may have flush deltas prepended describing their location (e.g., as if they were flushed independently of a transaction).

The BW-TREE (see, e.g., J. Levandoski, et al., "The Bw-Tree: A B-tree for New Hardware Platforms," *29th IEEE International Conference on Data Engineering* (ICDE 2013), Apr. 8-11, 2013) may provide an example key-value store that may enable user transactions to be supported (e.g., for the transactional component 202). For example, it may manage LSNs, enforce the write-ahead log (WAL) protocol, and respond to checkpointing requests as expected by a DEUTERONOMY data component (DC) (see, e.g., J. Levandoski et al., "Deuteronomy: Transaction Support for Cloud Data," *Conference on Innovative Data Systems Research* (CIDR) (January 2011), pp. 123-133 and D. Lomet et al., "Unbundling Transaction Services in the Cloud," *Conference on Innovative Data Systems Research* (CIDR), 2009). A discussion herein includes addressing how it may accomplish that when using an example system such as LLAMA.

"Data" content to the Update-D and Update-R LLAMA operations may include keys, LSNs, and the "data part" of a key value store. For example, a BW-TREE may thus, via these operations, implement a key value store, provide idempotence via LSNs, perform incremental updates via Update-D, perform its page consolidations via Update-R, and access pages for read or write using the LLAMA Read or Flush operation. For example, the system may include a record manager that may be configured to control updates based on update delta record operations and replacement update operations.

For example, an access method may store LSNs in the data it provides to LLAMA via update operations. Further, the Flush operation annotation parameter, stored in a flush delta, may provide additional information to describe page contents. For example, these may permit the BW-TREE to enforce write-ahead logging (WAL). For example, a Stabilize operation (e.g., Mk-Stable) after flushing a page may make updates stable for transaction log checkpointing.

For example, Allocate and Free operations may permit an example BW-TREE implementation to grow and shrink its tree. For example, BeginTrans (e.g., TBegin) and Commit/Abort (e.g., TCommit/TAbort) may enable the atomicity expected when performing structure modifications operations (SMOs).

For example, Update operations (e.g., Update-D/Update-R) may not be limited to "user level" data. For example, a BW-TREE may use Update-D to post its "merge" and "split" deltas when implementing SMOs, as discussed further below, with regard to system transactions.

Figure 6A:
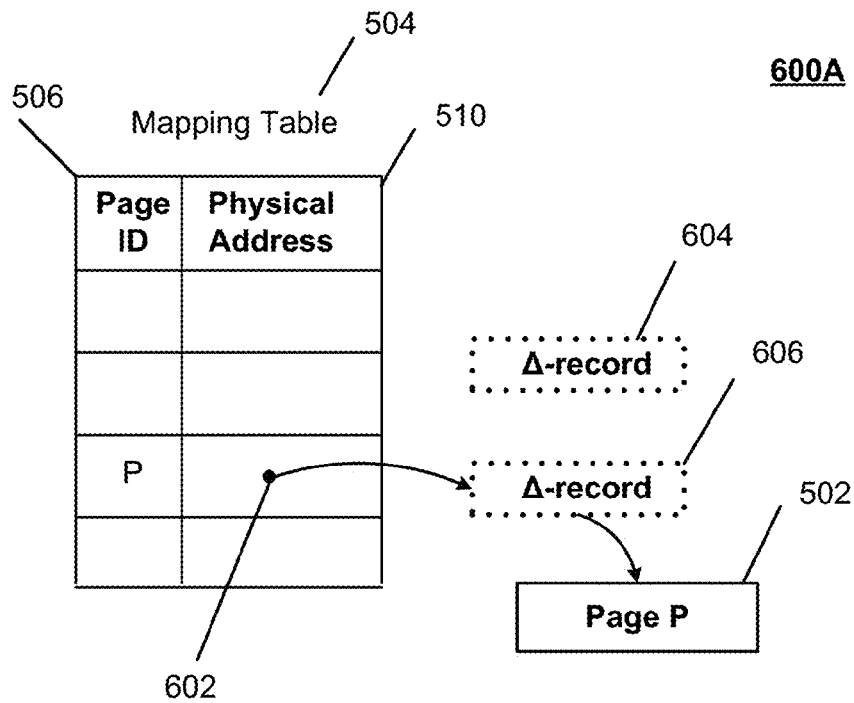
FIGS. 6A-6B illustrate example delta updates on an example mapping table.
Figure 6B:
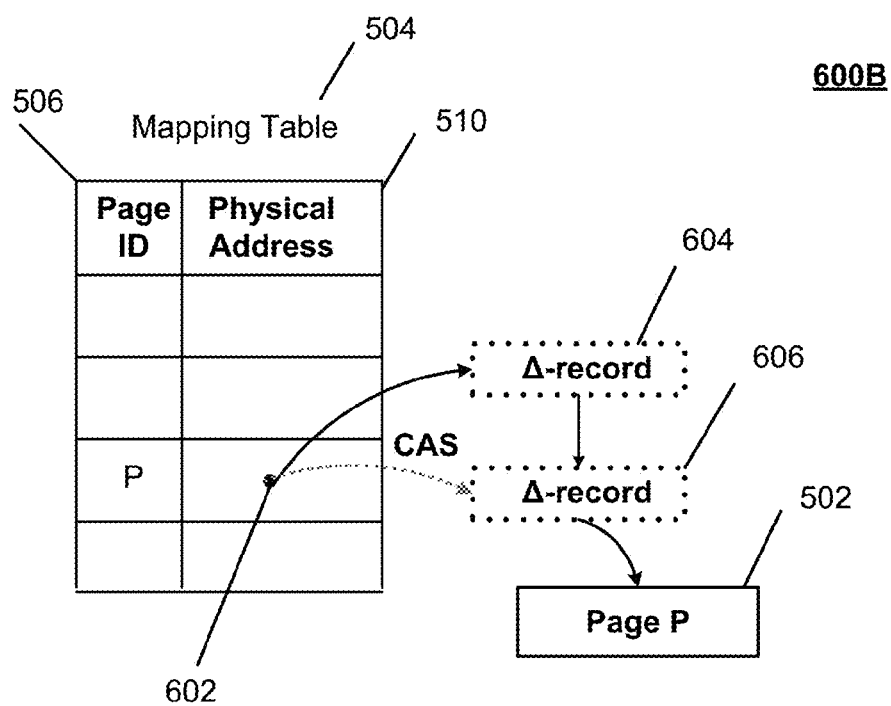

In accordance with example techniques discussed herein, with respect to cache layer data operations, page updating may be accomplished by installing a new page state pointer 602 in the mapping table 504 using a compare and swap operation (CAS), whether a delta update, as shown in FIG. 6A, or a replacement update. For example, a replacement update (e.g., Update-R(PID, in-ptr, out-ptr, data)) may include both the desired new state and the location of the prior state of the page in LSS. For example, a new update delta 604 (e.g., Update-D(PID, in-ptr, out-ptr, data)) points to the prior state 606 of the page 502, which already includes this LSS location.

For example, such a latch-free approach may avoid the delays introduced by latching, but it may incur a penalty of its own, as do "optimistic" concurrency control methods, i.e., the CAS may fail and the update will then be re-attempted. For example, it may be left to an example LLAMA user to retry its operation as appropriate, as an example LLAMA implementation may indicate when a failure occurs.

In accordance with example techniques discussed herein, while no operation may block when the data is in cache (e.g., 512), reading a page from secondary storage may involve waiting for the page to appear in the cache. The mapping table (e.g., the mapping table 504) will point to the LSS page, even for cached pages, as discussed above, enabling pages to be moved between cache and LSS for effective cache management.

In accordance with example techniques discussed herein, when a page is flushed, an example LLAMA implementation may ensure that what is represented in the cache (e.g., 512) matches what is in LSS (e.g., 514). Thus, the flush delta may include both PID and LSS offset in the flush delta, and may include that delta in the LSS buffer and in the cache (e.g., 512) by prepending it to the page 502.

In accordance with example techniques discussed herein, because an example LLAMA implementation may support delta updating, page state may include non-contiguous pieces. Combining this feature with flushing activity may result in an in-cache page having part of its state in LSS (having been flushed earlier), while recent updates may be present only in the cache. When this occurs, it may be possible to reduce the storage cost of the next flush.

Thus, an example LLAMA implementation may flush such a page by writing a delta that includes only the changes since the prior flush. For example, multiple update deltas in the cache may all be made contiguous for flushing by writing a contiguous form of the deltas (which may be referred to herein as a "C-delta"), with a pointer to the remainder of the page in LSS. Thus, the entire page may be accessible in LSS, but in possibly several pieces.

In accordance with example techniques discussed herein, the Flush operation may observe a cached page state that may have several parts that have been flushed over time in this manner, resulting in a cached page in which the separate pieces and their LSS addresses are represented. In accordance with example techniques discussed herein, at any time, Flush may bring these pieces together in LSS storage by writing the contents of the discontiguous page pieces contiguously (and redundantly). For example, a user may be willing to leave the pieces separate when LSS uses flash storage, while desiring contiguity when LSS uses disk storage, due to the differing read access and storage costs.

In accordance with example techniques discussed herein, when a page is flushed, it may be desirable for a system to know, prior to the flush, what state of the page is being flushed. For example, this may be easily ascertained using latches, as a system may simply latch the page, and perform the flush. However, in a latch-free approach, the system may have substantial difficulty in ordering page flushes correctly. For example, this may pose issues in enforcement of a write-ahead log protocol, or when the flush occurs as part of a structure modification. For example, it may be desirable for inappropriate flushes to fail when they perform their CAS. Thus, in accordance with example techniques discussed herein, the pointer to the page state to be flushed in the CAS may be used, which may then only capture that particular state and may fail if the state has been updated before the flush completes. However, this may raise other issues.

In research, difficulties have been encountered in determining the kind of strong invariant that may be advantageous when performing cache management and flushing pages to LSS. For example, an invariant may include properties such as:

A page that is flushed successfully to LSS is immediately seen in the cache as having been flushed, and the flushed state of the page will be in the LSS I/O buffer ahead of the flushes of all later states. A page whose flush has failed will not appear as flushed in the cache, and it will be clear when viewing LSS that the flush did not succeed.

For example, two alternative approaches may include:
a. Success of the flush may be ensured by first performing the CAS. Once the CAS succeeds, the page may be posted to the LSS. For example, if that is done, a race condition may undermine trustworthy LSS recovery. For example, a page may subsequently be flushed that depends upon the earlier flush, where this "later" flush succeeds in writing to LSS before a system crash, while the "earlier" flush is too slow to complete and does not appear in the stable LSS. This situation may compromise a form of causality.
b. The page state of the page that is desired to be flushed may be captured, and written to the LSS buffer. Then the CAS may be attempted, and the CAS may fail. Thus, a page is written to LSS with no indication for distinguishing whether the flush succeeded or failed should the system crash. For example, there may be multiple such pages written to LSS at various times. For example, a later state of the page may be written that appears earlier in the LSS than the failed CAS. As indicated above, it began later but obtained its buffer slot before the earlier flush.

For example, the dilemma discussed above may be resolved, as discussed below. For example, if the CAS is performed early enough, then it may be determined whether the flush will be successful or not, prior to copying the state of the page to the log buffer. Thus, an example flush procedure may be performed as follows:

Step 1: Identify the state of the page that is intended to be flushed.

Step 2: Seize space in the LSS buffer into which to write the state.

Step 3: Perform the CAS to determine whether the flush will succeed. The LSS offset in the flush delta will be obtained in order to do this (as provided in step 2 above).

Step 4: If step 3 succeeds, write the state to be saved into the LSS. While this is being written into the LSS, example LLAMA techniques discussed herein may prevent the buffer from being written to LSS secondary storage.

Step 5: If step 3 fails, write an indication indicating "Failed Flush" into the reserved space in the buffer. This may consume storage but resolves ambiguity as to which flushes have succeeded or failed.

The result of this example procedure is that the LSS, during recovery, might not observe pages that are the result of CAS's that have failed. For example, this also preserves the property that any page that appears later in the LSS (in terms of its position in the "log") will be a later state of the page than all earlier instances of the page in the LSS log.

In accordance with example techniques discussed herein, it may be desirable for an example LLAMA implementation to manage the cache and swap out data so as to meet its memory constraints. For example, the example LLAMA implementation may be aware of delta updates, replacement updates, and flushes, and may recognize each of these. However, the example LLAMA implementation will know nothing about the contents of the pages, if it is to be general purpose. Thus, the example LLAMA implementation is unaware whether the access method layer is supporting transactions by maintaining LSN's in the pages. Thus, an issue that may be posed includes a potential question regarding how an example LLAMA implementation may provide cache space management (including evicting pages) when it may not see LSN's and enforce the write-ahead log protocol.

For example, any data that has already been flushed may be dropped from the cache. For example, systems in which pages are updated in place may be prevented from swapping out (dropping from the cache) any recently updated and "dirty" page. However, because of delta updates, an example LLAMA implementation may determine which parts of pages have already been flushed. For example, each such part may be described with a flush delta, and those flushed parts may be "swapped out" of the cache.

In "swapping out" parts of pages, it may be disadvantageous to simply deallocate the storage and reuse it, as that may leave dangling references to the swapped out parts. Thus, in accordance with example techniques discussed herein, a delta may be used that describes what parts of a page have been swapped out.

For example, for a fully swapped out page, its main memory address in the mapping table 504 may be replaced with an LSS pointer from the page's most recent flush delta.

Figure 7:
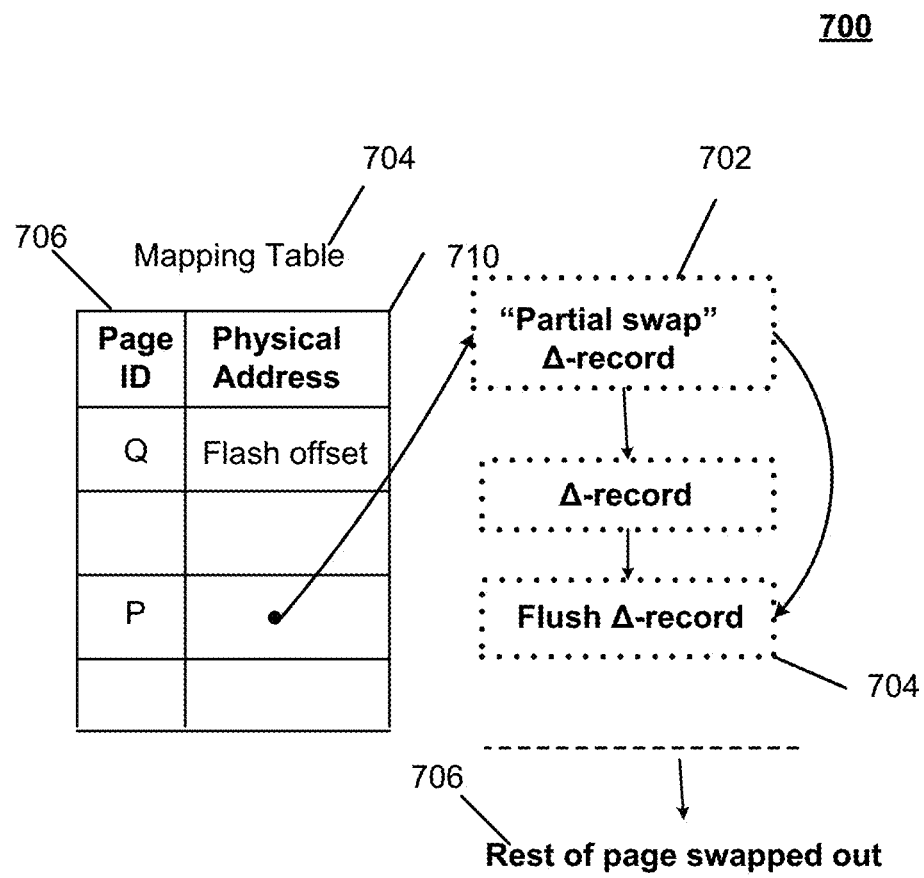
FIG. 7 depicts an example partial page swap out and an example partial swap delta.

FIG. 7 depicts an example partial page swap out and an example partial swap delta. For example, for partially swapped out pages, a CAS may be used to insert a "partial swap" delta record 702. For example, this delta record 702 may indicate that the page has been partially swapped out (e.g., so the page contents in the cache cannot be used to satisfy the usual page READ operation), and may point to a flush delta record 704 that indicates location information in the LSS for locating the missing part of the page 706. For example, once the "partial swap" delta 702 has been installed with a CAS, the memory for the part of the page being dropped may be freed using an example epoch mechanism.

For example, a page manager may be configured to initiate a swap operation of a portion of a first page in cache layer storage to a location in secondary storage, based on initiating a prepending of a partial swap delta record to a page state associated with the first page, the partial swap delta record including a secondary storage address indicating a storage location of a flush delta record that indicates a location in secondary storage of a missing part of the first page.

For example, the page manager may be further configured to initiate a free operation for cache layer storage associated with the portion of the first page, using an epoch mechanism.

In accordance with example techniques discussed herein, this approach may advantageously provide several useful features for users. For example, such an example LLAMA implementation's cache layer 304 may reclaim memory (e.g., 512) without knowledge regarding the actual content of pages. For example, dropping flushed pages and flushed parts of pages may involve no I/O operation. For example, bringing a partially flushed page back into main memory may involve fewer LSS reads than would be the case for a fully flushed page with multiple parts in LSS.

Figure 8A:
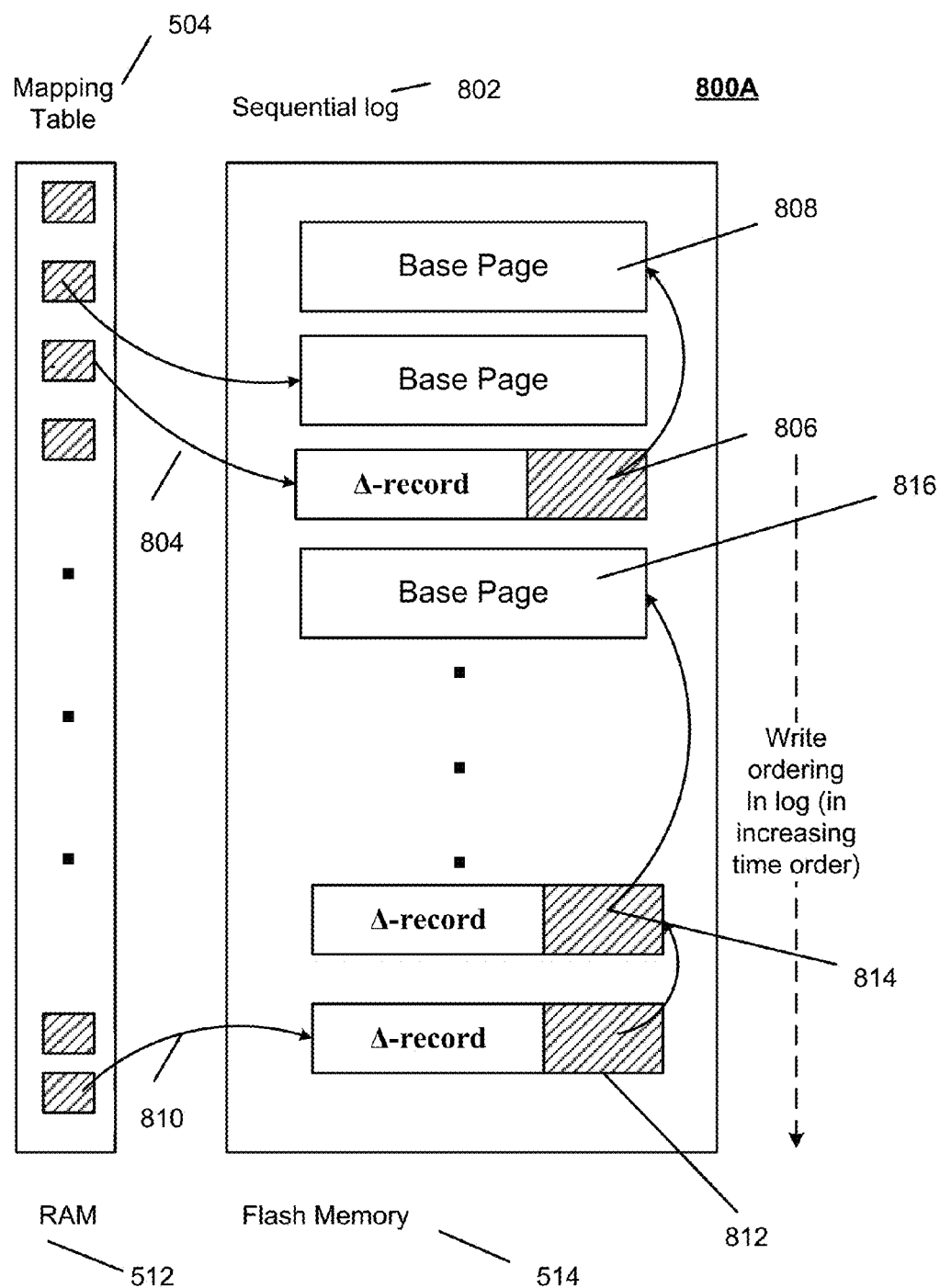
FIGS. 8A-8C illustrate an example log-structured storage organization on flash storage.

As discussed herein, a "logical page" may include a base page and zero or more delta records indicating updates to the page, thus allowing a page to be written to flash in pieces when it is flushed. Thus, a logical page on flash may correspond to records potentially on different physical device blocks that are linked together using file offsets as pointers. Further, a physical block may include records from multiple logical pages. FIG. 8A illustrates an example log-structured storage organization 800A on flash 514.

For example, a logical page may be read from flash 514 into memory (e.g., RAM 512) by starting from the head of the chain on flash (whose offset in a sequential log 802 may be obtained from the mapping table 504) and following the linked records. For example, an offset 804 may be obtained from the mapping table 504, for accessing a delta record 806, to obtain a current state, and a base page 808, for reading the corresponding "logical page" from flash 514 into memory 512.

For example, an offset 810 may be obtained from the mapping table 504, for accessing a delta record 812, to obtain the delta and link, to access a second delta record 814, and subsequently a base page 816, for reading the corresponding "logical page" from flash 514 into memory 512.

For example, the flush process may advantageously consolidate multiple delta records of the same logical page into a contiguous C-delta on flash when they are flushed together. Moreover, a logical page may be consolidated on flash when it is flushed after being consolidated in memory, which may advantageously improve page read performance.

Figure 8B:
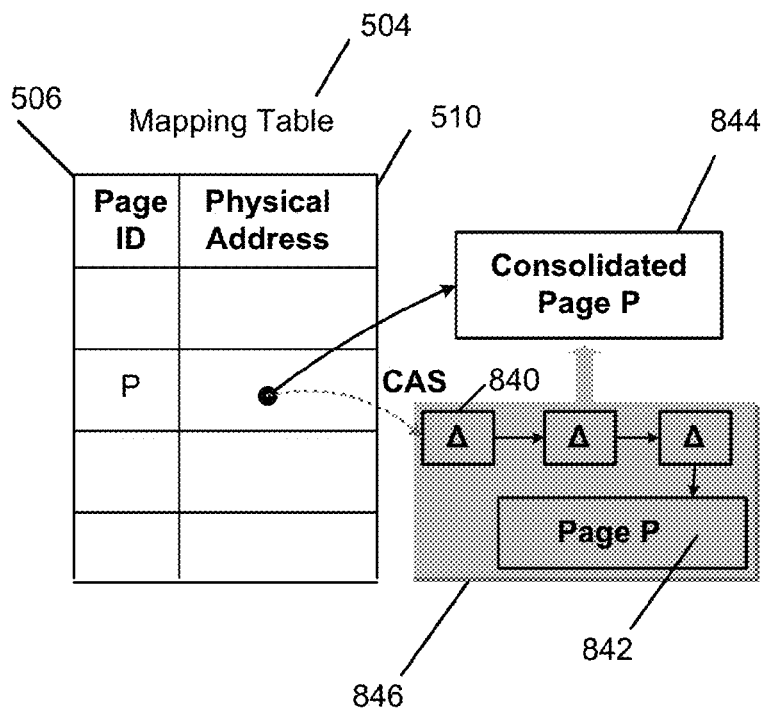

FIG. 8B depicts the example mapping table 504, indicating a replacement of a prior state 840 of a page 842 with the new state 844 of the page 842, based on replacing a physical address of first storage object 846 (e.g., which includes the base page 842 with a plurality of previously prepended delta records, in FIG. 8B) with a physical address of the new state 844 of the page 842 (e.g., resulting from a consolidation of the page 842 with the previously prepended delta records).

Figure 8C:
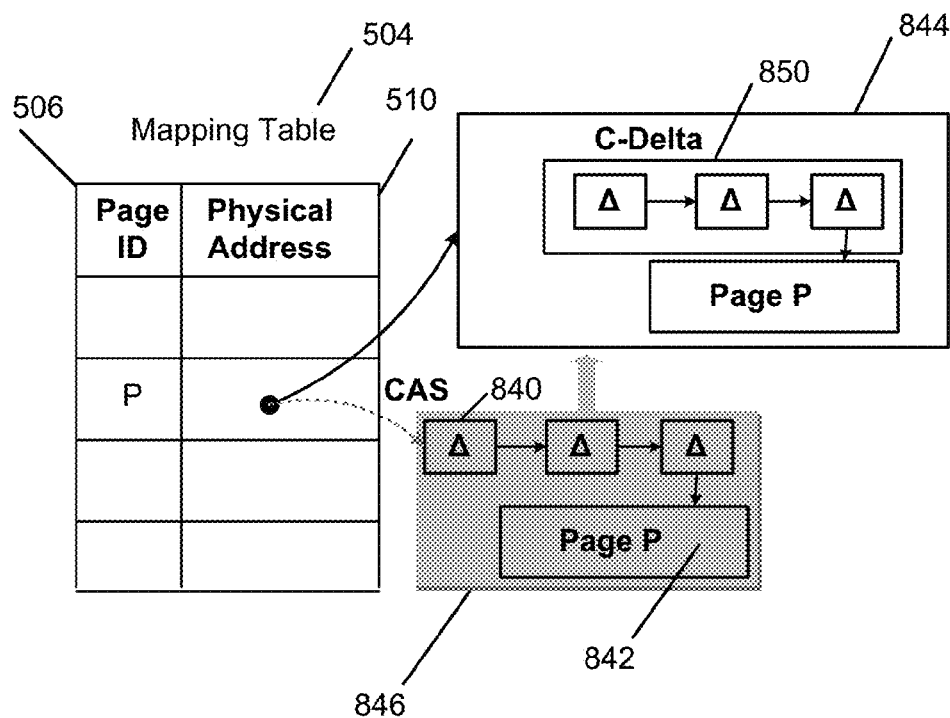

For example, as shown in FIG. 8C, replacing the prior state 840 of the page 842 with the new state 844 of the page 842 may include consolidating the plurality of delta records into a contiguous C-delta 850, which may then be flushed, together with the base page 842.

For example, replacing the prior state 840 of the page 842 with the new state 844 of the page 842 may include generating a modified version of the current page 842, or determining another page for replacing the current page 842, and replacing a physical address of the current page 842 with a physical address of the new state 844 of the page 842 (e.g., the modified version or the other page for replacement), via an atomic compare and swap operation on the mapping table 504.

For example, as a distinction between the features of FIG. 8B and FIG. 8C, when writing a page to secondary storage, LLAMA may perform the consolidation illustrated in FIG. 8C, but it depends upon the access method, executing an Update-R, to perform the consolidation of FIG. 8B.

In accordance with example techniques discussed herein, an example LLAMA implementation may be entirely latch-free. Further, dedicated threads might not be used to flush an I/O buffer, as this may complicate keeping thread workload balanced. Thus, all threads may participate in managing this buffer. For example, conventional approaches have utilized latches. However, such conventional techniques might only latch while allocating space in the buffer, releasing the latch prior to data transfers, which may then proceed in parallel.

In accordance with example techniques discussed herein, an example LLAMA implementation may avoid conventional latches for buffer space allocation, instead using a CAS for atomicity, as done elsewhere in the example systems discussed herein. For example, this involves defining the state on which the CAS executes. For example, the constant part of buffer state may include its address (Base) and size (Bsize). For example, the current high water mark of storage used in the buffer may be tracked with an Offset relative to the Base. For example, each request for the use of the buffer may begin with an effort to reserve space Size for a page flush.

In accordance with example techniques discussed herein, to reserve space in the buffer, a thread may acquire the current Offset and compute Offset+Size. For example, if Offset+Size≤Bsize then the request may be stored in the buffer. For example, the thread may issue a CAS with current Offset as the comparison value, and Offset+Size as the new value. If the CAS succeeds, Offset may be set to the new value, the space may be reserved, and the buffer writer may transfer data to the buffer.

In accordance with example techniques discussed herein, updates may proceed even when the entire page is not in cache. However, there may be times when an update needs the version of the page that has been read to remain unchanged between the read and a subsequent update. For example, a user may wish to determine whether the page state has changed since it was previously "looked at." (i.e., observed).

For example, in a "non-blind" update, the value of the mapping table pointer (which identifies the page state previously read) may accompany the update, certifying that the state has not changed since it was read. Since a READ operation for a page involves the presence of the page in the cache, this may ensure that the update will be made to an in-cache full page.

Blind updates may also involve a page state, to ensure that possibly conflicting operations have not intervened. For these operations, an operation P-READ (partial page read) may be used that reads whatever is currently in the page cache for the state, without triggering the read of the full page should the full page not be present. Then the address returned may be used in updates as before, only without a need for the full page to be in cache. If the mapping table only stores a flash offset, then a P-READ may read into cache the first part of the page referenced in flash, without a need to bring in the entire page.

Thus, an access method having such a PREAD operation may suffice for LLAMA to support blind updates from the access method.

For example, a "page stub" may be provided by using a flush delta with a particular annotation, together with its reference to the remainder of the page state in cache and a flash offset (stable storage location) for a location where the page has been placed in stable storage. For example, a stub may be "created" when the cache manager then swaps out the page via a "partial swap" up to the last flush delta. However, in accordance with example techniques discussed herein, the flush delta may be left in place instead of replacing the mapping table address with a flash offset. The remaining flush delta may retain this flash offset plus the annotation for users of LLAMA (e.g. the BW-TREE). An access method may read a page stub (or more of the page, if present in the cache) with a PREAD to determine what it may do with the page.

As discussed above, the BW-TREE may be used as an indexed record manager built to execute on top of LLAMA as its page-oriented cache manager. At this layer, a record manager supports typical CRUD (create, read, update, delete) operations as a minimum. The CRUD operations may involve knowledge of the prior state of the record store, which may involve cache operations at LLAMA that may involve reading the entire page to acquire that knowledge.

To support "blind" style record operations, additional operations may be utilized. For example, an UPSERT operation uses a new record version to replace an existing record if it exists, or to create (insert) the record if it does not yet exist. Thus, it combines the C of CRUD with the U (Create and Update). Within the LLAMA example discussed above, an UPSERT may perform a P-READ instead of an ordinary read, and then proceed with its update (e.g., using an UPDATE-D).

For example, an example BLIND-D operation, or blind delete (the D in CRUD) may be used, in addition to a "normal" delete that checks whether a version is present before deleting, and hence involving a page READ. This operation may involve only performing a P-READ. Such a BLIND-D operation may have various, different definitions. For example, it may delete a prior version when the page is eventually read and rationalized, and may be a no-op if there is no prior version.

As another example, it may linger as a delete request, "discharged" only when a subsequent version is added for the record.

In either event, the effect of the BLIND-D may not be fully realized until the page is entirely in memory via a READ.

For example, an application may support a blind incremental update of a record, of the UPSERT form. Incremental record changes (as opposed to the complete replacement update model for record updates discussed above) may involve "intra record" semantics that are not conventionally known by a record oriented access method such as the BW-TREE.

Incremental record updates (UPDATE-I), which produce changes but not replacements of records, may use the same LLAMA operations as blind writes, i.e. PREADs instead of READs. Thus, they may be treated similarly to UPSERTs. However, the BW-TREE is not able, by itself, to understand how to consolidate these updates into a record version. Discussed below are two example techniques for handling this "consolidation"

As a first example, an application using the BW-TREE may issue a record read (READ) (the R in CRUD). For example, the BW-TREE may gather the pieces of the updated record together via concatenation of the pieces it has received. Subsequent to this read, the application presents a consolidated record as a "normal" update that replaces the prior, pieced together record with a record that has been consolidated by the application. No additional functionality (aside from UPDATE-I) may be involved.

As a second example, an application may provide to the BW-TREE a procedure that understands how to consolidate a record in concatenated pieces format, into an application understood consolidated format. There are a variety of ways that this procedure might be provided, once in information retained about the "table" being supported by the BW-TREE, or by providing a call-back point that the BW-TREE can call to perform this function, e.g. prior to delivering the record as part of a READ, or during the page consolidation process done by the BW-TREE as it incorporates delta updates into a consolidated page.

In accordance with example techniques discussed herein, both of these variants may be supported.

Discussed below are example techniques for replacing the record pieces that are the result of UPDATE-I with the version that has been consolidated, by either example technique discussed above.

Thus, it may be desirable to store the consolidated record in the BW-TREE, replacing the UPDATE-I increments that were provided before.

For example, a CONSOLIDATE-I operation may work on a record when it has been solely updated by prior UPDATE-I operations. Such a CONSOLIDATE-I operation, may identify prior UPDATE-I's that are to be replaced, and then post this consolidated version into the BW-TREE. It may be assumed that each UPDATE-I has an LSN that is used for idempotence. When consolidation occurred, it is known which of the UPDATE-I's went into the consolidated version that was produced. Thus, the consolidated record can retain these LSNs when it is used in an update delta for the page. This enables future operations, both future consolidates and future BW-TREE operations to provide idempotence.

The BW-TREE knows how to consolidate a page, and may use an UPDATE-R LLAMA operation to replace the current form of the page with the new form. During this process, the BW-TREE may remove from the page all UPDATE-I's that are captured in the CONSOLIDATE-I operation, replacing them with the consolidated record. Any UPDATE-I operations that are not captured with the consolidated record may remain as unconsolidated entries for the record (e.g., to be consolidated later). The BW-TREE does not need to understand the details of the consolidation to accomplish this. It need know only about the LSN information captured in the consolidated record.

One skilled in the art of data processing will appreciate that many other types of techniques may be used for index insertions using blind incremental updates, without departing from the spirit of the discussion herein.

II. Example Operating Environment

Features discussed herein are provided as example embodiments that may be implemented in many different ways that may be understood by one of skill in the art of data processing, without departing from the spirit of the discussion herein. Such features are to be construed only as example embodiment features, and are not intended to be construed as limiting to only those detailed descriptions.

Figure 9:
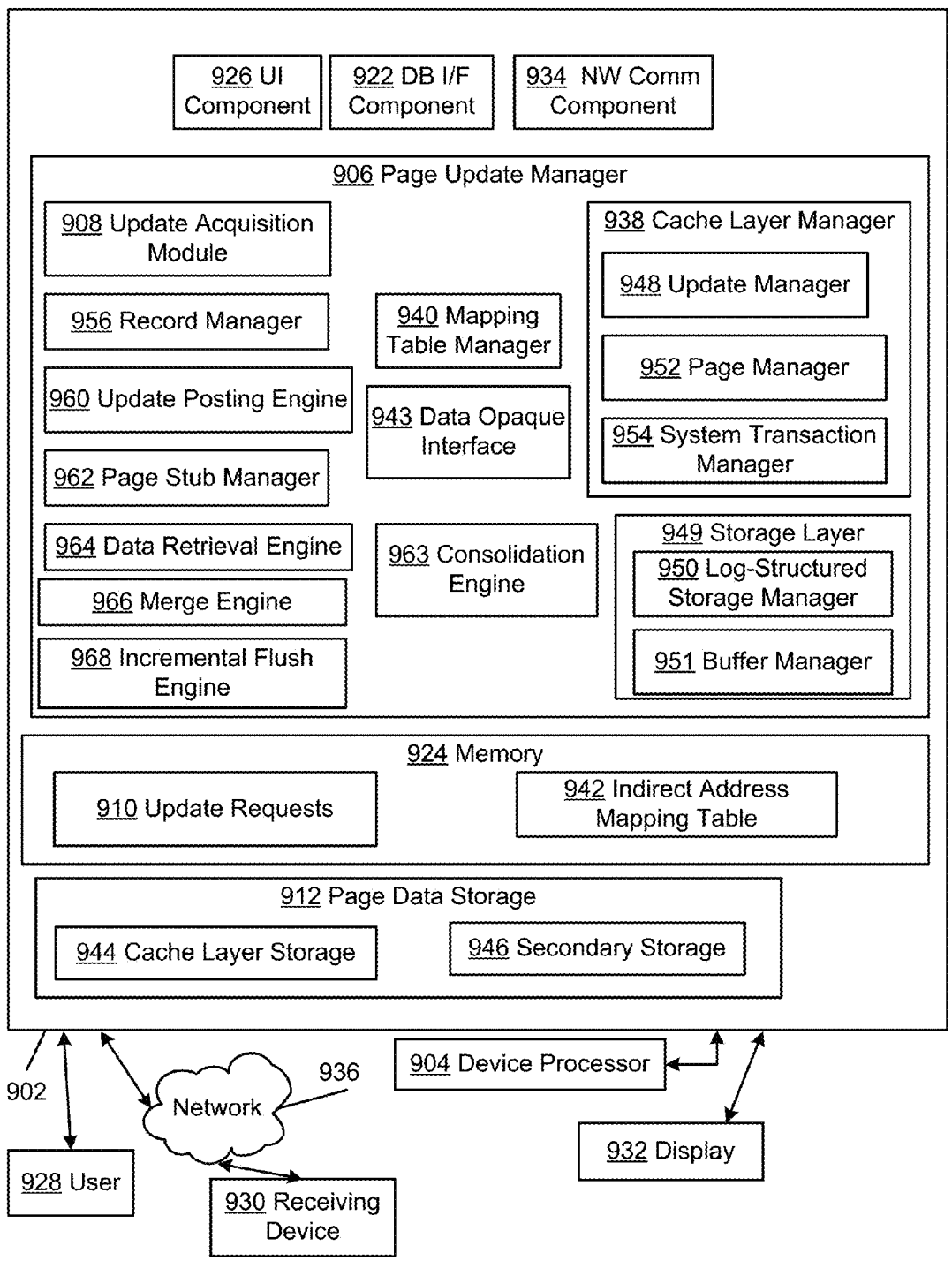
FIG. 9 is a block diagram of an example system for data modifications using blind update operations.

As further discussed herein, FIG. 9 is a block diagram of a generalized system 900 for data modifications using blind update operations (including both incremental and complete record replacements). The generalized system 900 as shown is merely intended to illustrate various example functionality and/or logic that may be included in example techniques as discussed herein, and is not intended to be limiting in terms of implementations in various hardware and/or software configurations. One skilled in the art of data processing will appreciate that system 900 may be realized in hardware implementations, software implementations, or combinations thereof. As shown in FIG. 9, a system 900 may include a device 902 that includes at least one processor 904. The device 902 may include a page update manager 906 that may include an update acquisition module 908 that obtains a plurality of update requests 910 that specify updates for a logical page associated with a key-value store.

For example, page data storage 912 may include any type of page data storage, including (at least) volatile storage such as main memory, and more stable storage (e.g., more non-volatile storage) such as "secondary storage," which may include flash storage, as well as other types of disk drives, etc. One skilled in the art of data processing will appreciate that there are many types of page data storage that may be used with techniques discussed herein, without departing from the spirit of the discussion herein.

According to an example embodiment, the page update manager 906, or one or more portions thereof, may include executable instructions that may be stored on a tangible computer-readable storage medium, as discussed below. According to an example embodiment, the computer-readable storage medium may include any number of storage devices, and any number of storage media types, including distributed devices.

In this context, a "processor" may include a single processor or multiple processors configured to process instructions associated with a computing system. A processor may thus include one or more processors executing instructions in parallel and/or in a distributed manner. Although the device processor 904 is depicted as external to the page update manager 906 in FIG. 9, one skilled in the art of data processing will appreciate that the device processor 904 may be implemented as a single component, and/or as distributed units which may be located internally or externally to the page update manager 906, and/or any of its elements.

For example, the system 900 may include one or more processors 904. For example, the system 900 may include at least one tangible computer-readable storage medium storing instructions executable by the one or more processors 904, the executable instructions configured to cause at least one data processing apparatus to perform operations associated with various example components included in the system 900, as discussed herein. For example, the one or more processors 904 may be included in the at least one data processing apparatus. One skilled in the art of data processing will understand that there are many configurations of processors and data processing apparatuses that may be configured in accordance with the discussion herein, without departing from the spirit of such discussion.

In this context, a "component" or "module" may refer to instructions or hardware that may be configured to perform certain operations. Such instructions may be included within component groups of instructions, or may be distributed over more than one group. For example, some instructions associated with operations of a first component may be included in a group of instructions associated with operations of a second component (or more components). For example, a "component" herein may refer to a type of functionality that may be implemented by instructions that may be located in a single entity, or may be spread or distributed over multiple entities, and may overlap with instructions and/or hardware associated with other components.

According to an example embodiment, the page update manager 906 may be implemented in association with one or more user devices. For example, the page update manager 906 may communicate with a server, as discussed further below.

For example, one or more databases may be accessed via a database interface component 922. One skilled in the art of data processing will appreciate that there are many techniques for storing information discussed herein, such as various types of database configurations (e.g., relational databases, hierarchical databases, distributed databases) and non-database configurations.

According to an example embodiment, the page update manager 906 may include a memory 924 that may store objects such as intermediate results. In this context, a "memory" may include a single memory device or multiple memory devices configured to store data and/or instructions. Further, the memory 924 may span multiple distributed storage devices. Further, the memory 924 may be distributed among a plurality of processors.

According to an example embodiment, a user interface component 926 may manage communications between a user 928 and the page update manager 906. The user 928 may be associated with a receiving device 930 that may be associated with a display 932 and other input/output devices. For example, the display 932 may be configured to communicate with the receiving device 930, via internal device bus communications, or via at least one network connection.

According to example embodiments, the display 932 may be implemented as a flat screen display, a print form of display, a two-dimensional display, a three-dimensional display, a static display, a moving display, sensory displays such as tactile output, audio output, and any other form of output for communicating with a user (e.g., the user 928).

According to an example embodiment, the page update manager 906 may include a network communication component 934 that may manage network communication between the page update manager 906 and other entities that may communicate with the page update manager 906 via at least one network 936. For example, the network 936 may include at least one of the Internet, at least one wireless network, or at least one wired network. For example, the network 936 may include a cellular network, a radio network, or any type of network that may support transmission of data for the page update manager 906. For example, the network communication component 934 may manage network communications between the page update manager 906 and the receiving device 930. For example, the network communication component 934 may manage network communication between the user interface component 926 and the receiving device 930.

For example, a cache layer manager 938 may include a mapping table manager 940 that may be configured to initiate table operations on an indirect address mapping table 942, the table operations including initiating atomic compare and swap (CAS) operations on entries in the indirect address mapping table 942, to replace prior states of pages that are associated with the page data storage 912, with new states of the pages.

For example, using such atomic operations may provide full multi-threading capability—i.e., any thread may access any data, thus, advantageously providing speed capabilities in processing.

For example, the mapping table manager 940 may be configured to initiate the table operations on the indirect address mapping table 942 associated with a data opaque interface 943, wherein the indirect address mapping table 942 is used in common for management of data storage that includes cache layer storage 944 and secondary storage 946.

For example, the indirect address mapping table 942 separates logical locations of pages from corresponding physical locations of the pages, wherein users of the page data storage store page identifier values in lieu of physical location address values for the pages, elsewhere in data structures referencing the page data storage.

For example, an update manager 948 may be configured to control data updates and management updates using latch-free compare and swap operations on entries in the indirect address mapping table 942 to effect atomic state changes on the indirect address mapping table 942.

For example, a storage layer 949 may include a log-structured storage layer manager 950 that may be configured to control page location changes associated with log structuring resulting from page flushes, using latch-free compare and swap operations on entries in the indirect address mapping table 942.

For example, a buffer manager 951 may be configured to control updates to a log-structured secondary storage buffer via latch-free update operations. Thus, for example, multiple threads may simultaneously update the log-structured secondary storage buffer via latch-free operations.

For example, the buffer manager 951 may be configured to initiate a stability operation for determining that pages flushed to the log-structured secondary storage buffer, having lower addresses, up to a first secondary storage address argument, are stable in the log-structured secondary storage.

For example, a page manager 952 may be configured to control flush operations, allocate operations, and free operations on pages. For example, the page manager 952 may be configured to initiate a flush operation of a first page in cache layer storage to a location in secondary storage, based on initiating a copy of a page state of the first page into a secondary storage buffer, initiating a prepending of a flush delta record to the page state, the flush delta record including a secondary storage address indicating a storage location of the first page in secondary storage and an annotation associated with a caller, and initiating an update to the page state based on installing an address of the flush delta record in a mapping table, via a compare and swap (CAS) operation.

For example, the page manager 952 may be configured to initiate a swap operation of a portion of a first page in cache layer storage to a location in secondary storage, based on initiating a prepending of a partial swap delta record to a page state associated with the first page, the partial swap delta record including a main memory address indicating a storage location of a flush delta record that indicates a location in secondary storage of a missing part of the first page.

For example, a system transaction manager 954 may be configured to commit transactions and abort transactions.

For example, a record manager 956 may be configured to control updates based on update delta record operations and replacement update operations.

For example, the page manager 952 may be configured to flush a page state to secondary storage based on installing a pointer to a flush delta record in a mapping table, via a compare and swap (CAS) operation, the flush delta record prepended to an existing page state that is replaced in the mapping table via the CAS operation.

For example, the page manager 952 may be configured to determine whether the CAS operation succeeds, and to initiate a write operation to write the existing page state to a secondary storage flush buffer, if it is determined that the CAS operation succeeds.

For example, the page manager 952 may be configured to initiate a void operation to storage space previously allocated for the existing page, if it is determined that the CAS operation fails.

An update posting engine 960 may post the updates using the obtained update requests, without accessing the logical page via a read operation.

For example, a page stub manager 962 may initiate a prepending of a page stub to a current state of the logical page via a page stub delta record representing the page stub, the page stub including an indication of an address of a current state of the logical page and metadata specifying attributes of the logical page, the prepending of the page stub to the current state initiated by installing an address of the page stub delta record representing the page stub in a mapping table, via an atomic operation. For example, the page stub may include values of key boundaries associated with the logical page.

For example, the update acquisition module 908 may obtain a plurality of update requests 910 that specify record updates to the logical page.

For example, the update posting engine 960 may post the obtained record updates using the obtained plurality of update requests 910, without accessing the logical page via a read operation.

For example, the update posting engine 960 may post the obtained record updates by prepending a plurality of respective delta records to the page stub. The respective delta records may include record update information that specifies the respective updates to the logical page that are specified in the respective plurality of update requests.

For example, a consolidation engine 963 may consolidate the obtained record updates via a predefined consolidation function, using the plurality of respective delta records that are prepended to the page stub.

For example, the update acquisition module 908 may obtain a plurality of update requests 910 that specify incremental updates to a record in the logical page.

For example, the update posting engine 960 may incrementally post the obtained specified incremental updates using the obtained update requests 910, without accessing the logical page via a read operation.

For example, the update posting engine 960 may incrementally post the obtained specified incremental updates by incrementally prepending a plurality of respective delta records to the page stub, wherein the plurality of respective delta records include key update information that specifies the respective updates to the record.

For example, a data retrieval engine 964 may initiate a lookup of a key in the key-value store, to obtain a representation of at least a portion of the logical page, in a current state of the logical page, via a read operation from storage into memory.

For example, a merge engine 966 may merge the obtained specified incremental updates via a predefined merge function, using the plurality of respective delta records that are prepended to the page stub. For example, the predefined merge function includes a user-defined merge function.

For example, an incremental flush engine 968 may incrementally flush contents of the logical page, with the plurality of respective delta records that are prepended to the page stub, to a flush buffer storage area that is appended to storage using a single write operation.

For example, the key-value store includes keys that represent terms associated with respective documents, and respective values that represent respective document identifiers.

For example, the logical page is stored on secondary storage.

One skilled in the art of data processing will appreciate that many different techniques may be used for data modifications using blind updates, without departing from the spirit of the discussion herein.

III. Flowchart Description

Features discussed herein are provided as example embodiments that may be implemented in many different ways that may be understood by one of skill in the art of data processing, without departing from the spirit of the discussion herein. Such features are to be construed only as example embodiment features, and are not intended to be construed as limiting to only those detailed descriptions.

Figure 10A:
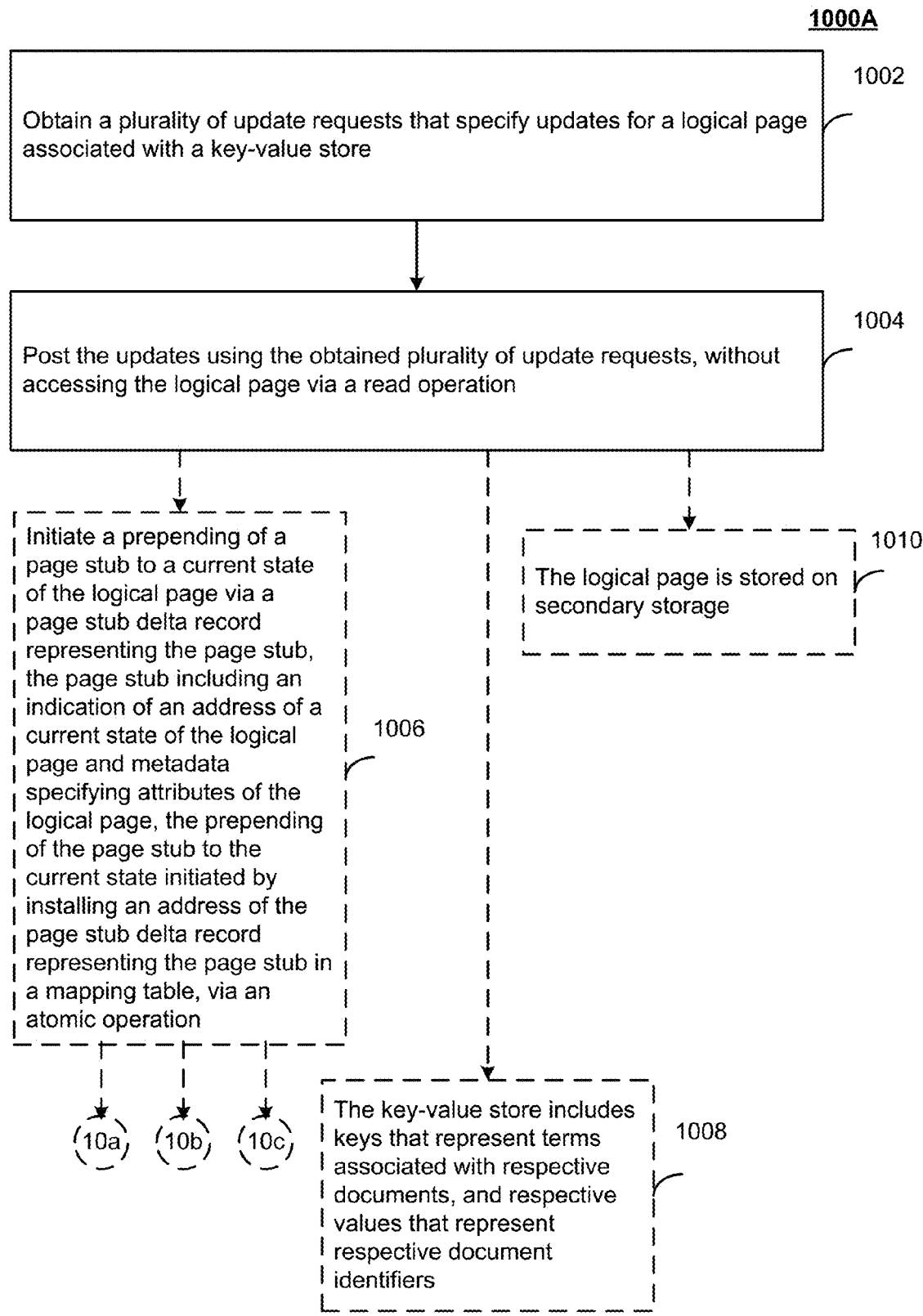
FIGS. 10A-10C are a flowchart illustrating example operations of the system of FIG. 9.
Figure 10B:
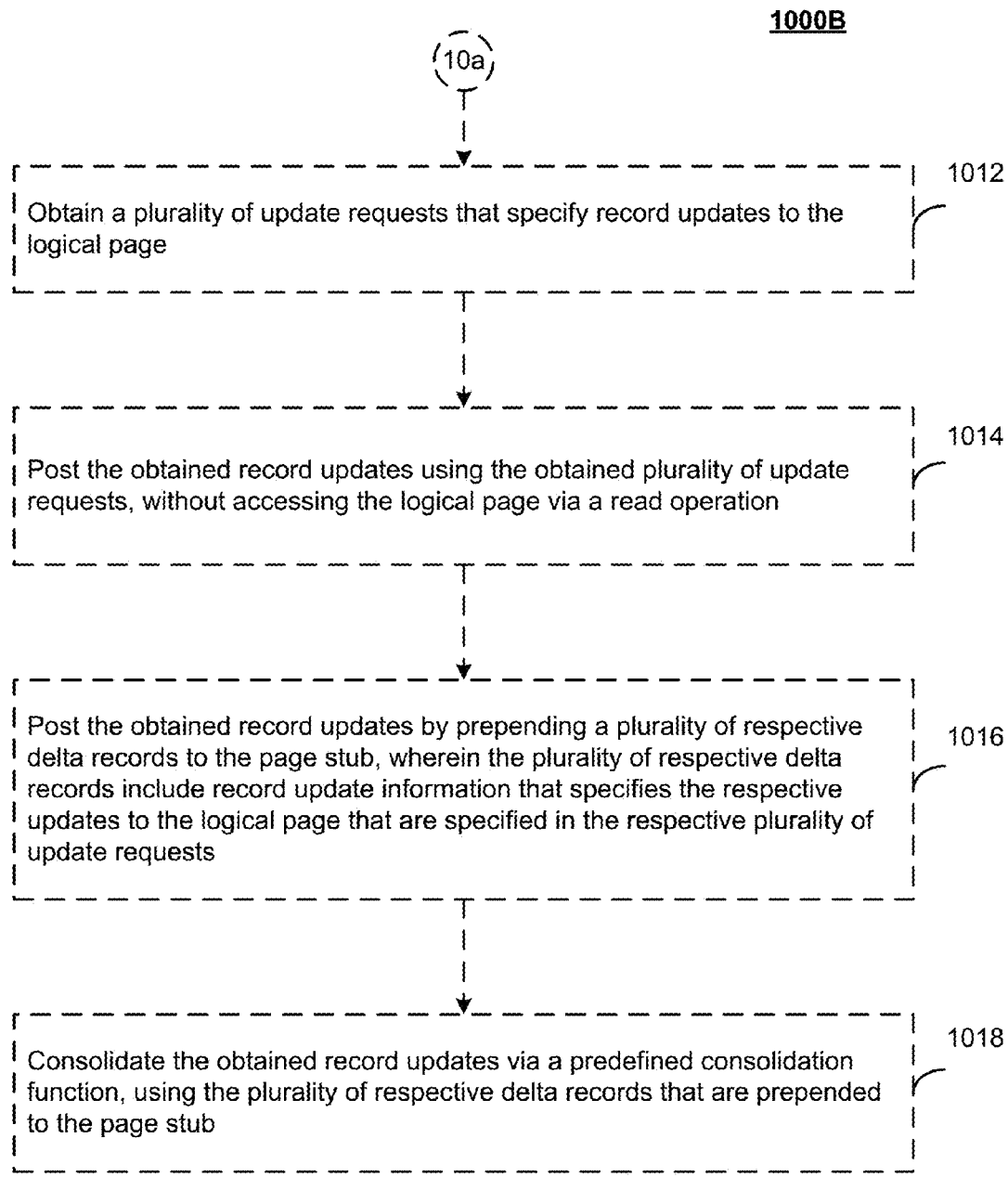
Figure 10C:
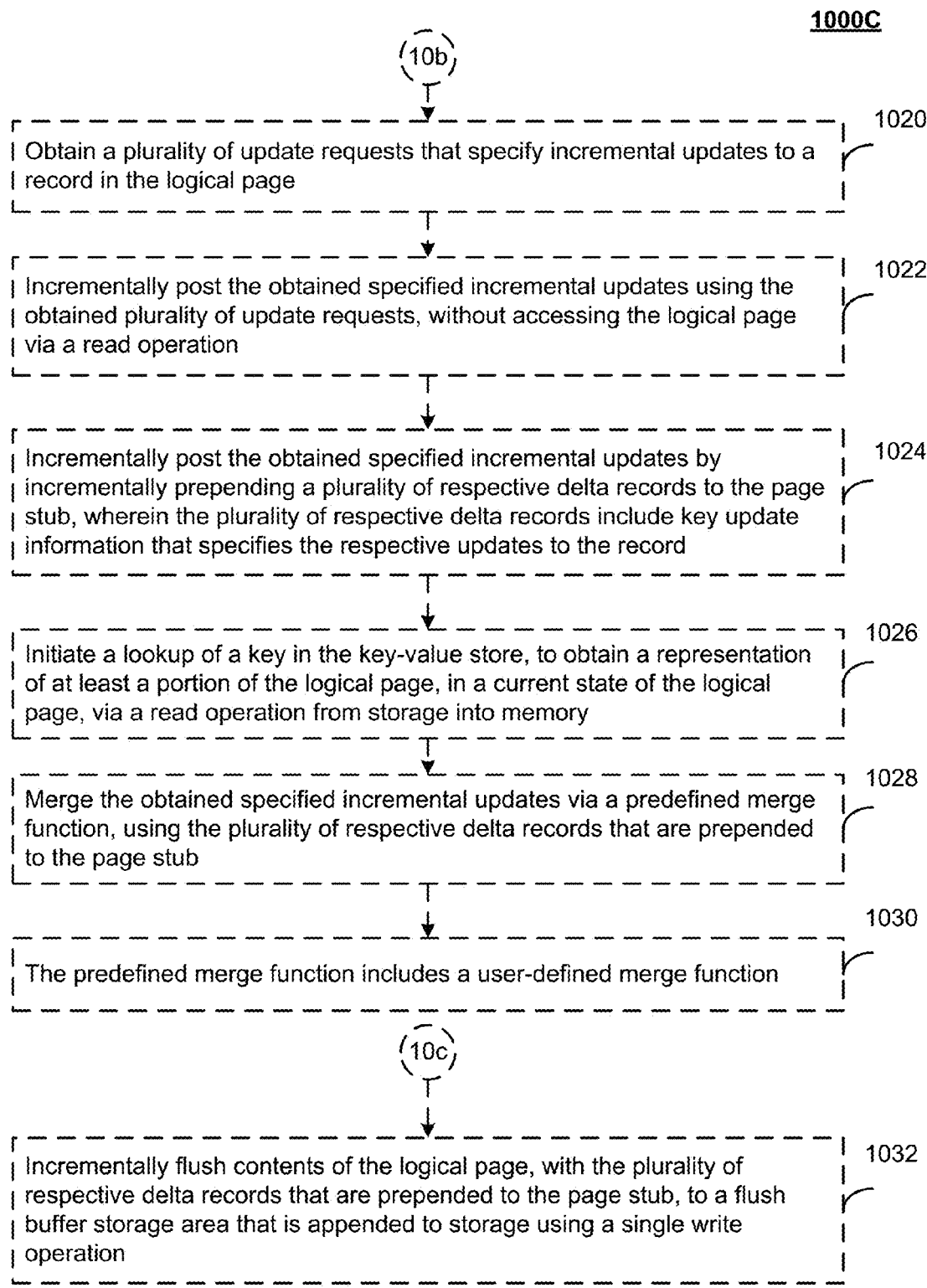

FIGS. 10A-10C are a flowchart illustrating example operations of the system of FIG. 9, according to example embodiments. In the example of FIG. 10A, a plurality of update requests that specify updates for a logical page associated with a key-value store may be obtained (1002).

The updates may be posted using the obtained plurality of update requests, without accessing the logical page via a read operation (1004).

For example, a prepending of a page stub to a current state of the logical page may be initiated via a page stub delta record representing the page stub, the page stub including an indication of an address of a current state of the logical page and metadata specifying attributes of the logical page, the prepending of the page stub to the current state initiated by installing an address of the page stub delta record representing the page stub in a mapping table, via an atomic operation (1006).

For example, the key-value store may include keys that represent terms associated with respective documents, and respective values that represent respective document identifiers (1008).

For example, the logical page may be stored on secondary storage (1010).

For example, a plurality of update requests that specify record updates to the logical page may be obtained (1012), in the example of FIG. 10B.

For example, the obtained record updates may be posted using the obtained plurality of update requests, without accessing the logical page via a read operation (1014).

For example, the obtained record updates may be posted by prepending a plurality of respective delta records to the page stub, wherein the plurality of respective delta records include record update information that specifies the respective updates to the logical page that are specified in the respective plurality of update requests (1016).

For example, the obtained record updates may be consolidated via a predefined consolidation function, using the plurality of respective delta records that are prepended to the page stub (1018).

For example, a plurality of update requests that specify incremental updates to a record in the logical page may be obtained (1020), in the example of FIG. 10C.

For example, the obtained specified incremental updates may be incrementally posted using the obtained plurality of update requests, without accessing the logical page via a read operation (1022).

For example, the obtained specified incremental updates may be incrementally posted by incrementally prepending a plurality of respective delta records to the page stub, wherein the plurality of respective delta records include key update information that specifies the respective updates to the record (1024).

For example, a lookup of a key in the key-value store may be initiated, to obtain a representation of at least a portion of the logical page, in a current state of the logical page, via a read operation from storage into memory (1026).

For example, the obtained specified incremental updates may be merged via a predefined merge function, using the plurality of respective delta records that are prepended to the page stub (1028).

For example, the predefined merge function may include a user-defined merge function (1030).

For example, contents of the logical page, with the plurality of respective delta records that are prepended to the page stub, may be incrementally flushed to a flush buffer storage area that is appended to storage using a single write operation (1032).

Figure 11A:
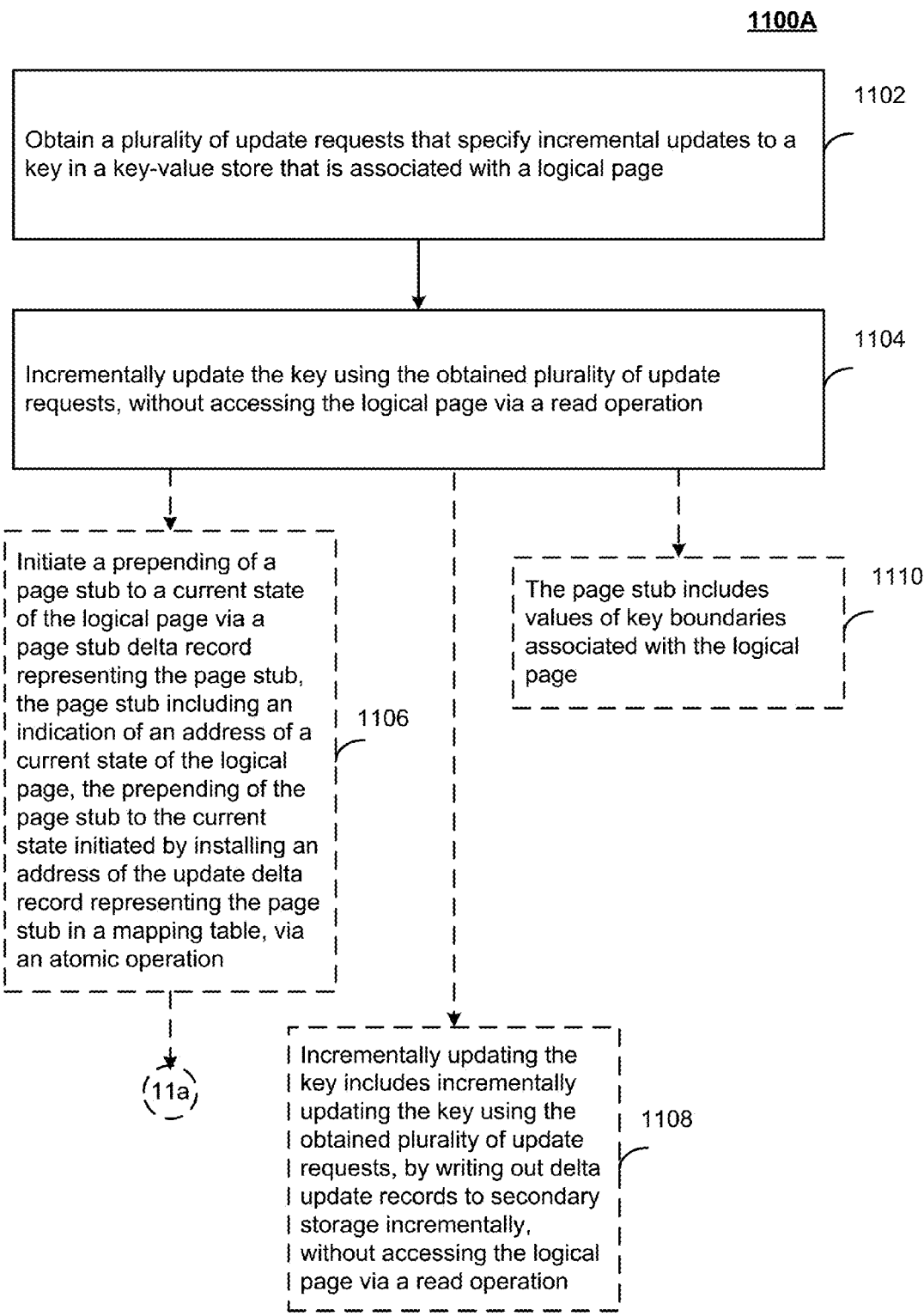
FIGS. 11A-11B are a flowchart illustrating example operations of the system of FIG. 9.
Figure 11B:
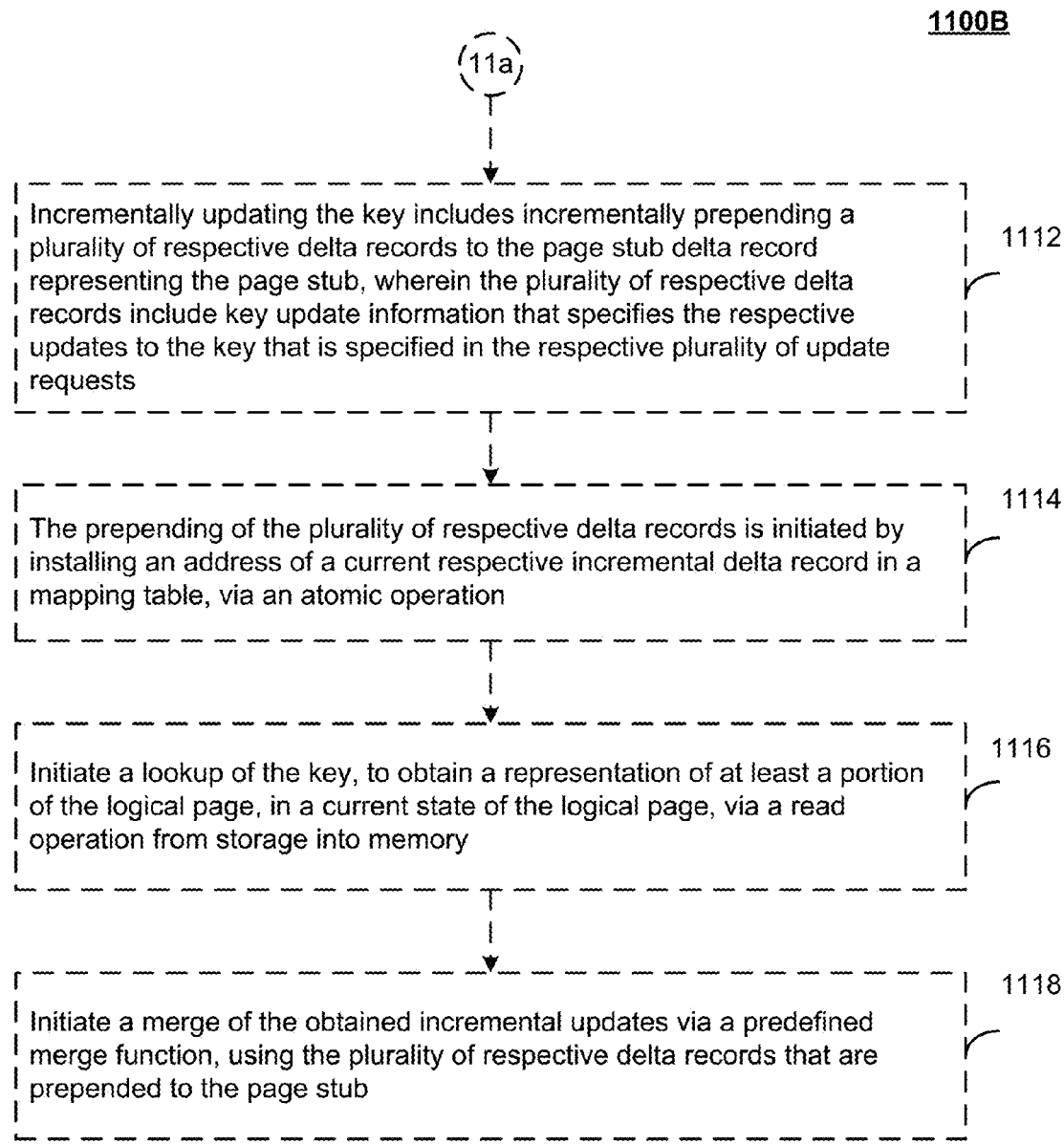

FIGS. 11A-11B are a flowchart illustrating example operations of the system of FIG. 9, according to example embodiments. In the example of FIG. 11A, a plurality of update requests that specify incremental updates to a key in a key-value store that is associated with a logical page may be obtained (1102).

The key may be incrementally updated using the obtained plurality of update requests, without accessing the logical page via a read operation (1104).

For example, a prepending of a page stub to a current state of the logical page may be initiated via a page stub delta record representing the page stub, the page stub including an indication of an address of a current state of the logical page, the prepending of the page stub to the current state initiated by installing an address of the update delta record representing the page stub in a mapping table, via an atomic operation (1106).

For example, incrementally updating the key may include incrementally updating the key using the obtained plurality of update requests, by writing out delta update records to secondary storage incrementally, without accessing the logical page via a read operation (1108).

For example, the page stub may include values of key boundaries associated with the logical page (1110).

For example, incrementally updating the key may include incrementally prepending a plurality of respective delta records to the page stub delta record representing the page stub, wherein the plurality of respective delta records include key update information that specifies the respective updates to the key that is specified in the respective plurality of update requests (1112), in the example of FIG. 11B.

For example, the prepending of the plurality of respective delta records may be initiated by installing an address of a current respective incremental delta record in a mapping table, via an atomic operation (1114).

For example, a lookup of the key may be initiated, to obtain a representation of at least a portion of the logical page, in a current state of the logical page, via a read operation from storage into memory (1116).

For example, a merge of the obtained incremental updates may be initiated via a predefined merge function, using the plurality of respective delta records that are prepended to the page stub (1118).

Figure 12:
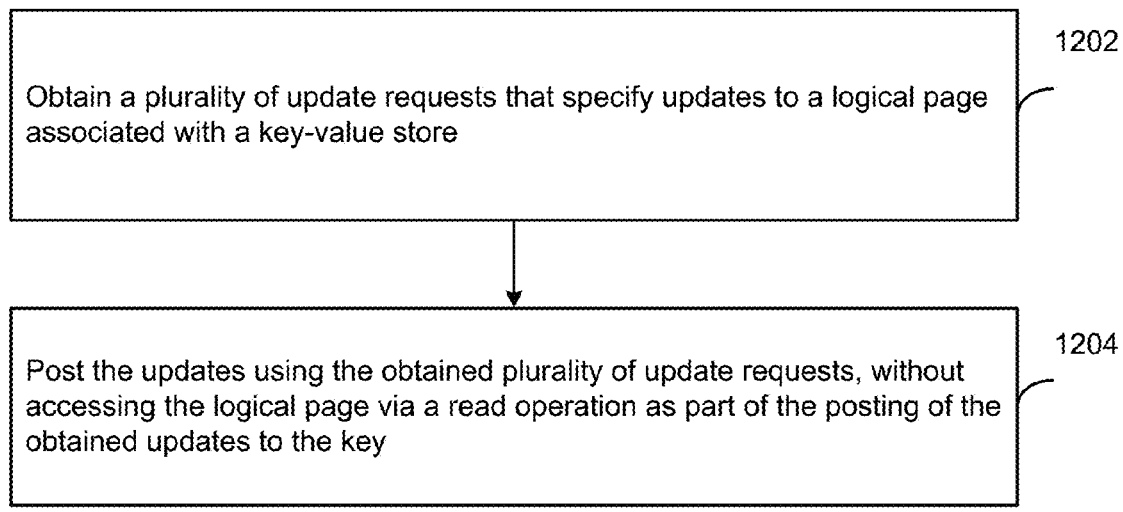
FIG. 12 is a flowchart illustrating example operations of the system of FIG. 9.

FIG. 12 is a flowchart illustrating example operations of the system of FIG. 9, according to example embodiments. In the example of FIG. 12, a plurality of update requests that specify updates to a logical page associated with a key-value store may be obtained (1202).

The updates may be posted using the obtained plurality of update requests, without accessing the logical page via a read operation as part of the posting of the obtained updates to the key (1204).

IV. Aspects of Certain Embodiments

Features discussed herein are provided as example embodiments that may be implemented in many different ways that may be understood by one of skill in the art of data processing, without departing from the spirit of the discussion herein. Such features are to be construed only as example embodiment features, and are not intended to be construed as limiting to only those detailed descriptions.

For example, a system includes an apparatus that includes at least one processor and a computer-readable storage medium storing executable instructions that are executable by the at least one processor, the executable instructions including a page update manager that includes an update acquisition module that obtains a plurality of update requests that specify updates for a logical page associated with a key-value store. An update posting engine posts the updates using the obtained plurality of update requests, without accessing the logical page via a read operation.

A page stub manager initiates a prepending of a page stub to a current state of the logical page via an page stub delta record representing the page stub, the page stub including an indication of an address of a current state of the logical page and metadata specifying attributes of the logical page, the prepending of the page stub to the current state initiated by installing an address of the page stub delta record representing the page stub in a mapping table, via an atomic operation.

The update acquisition module obtains a plurality of update requests that specify record updates to the logical page; and the update posting engine posts the obtained record updates using the obtained plurality of update requests, without accessing the logical page via a read operation.

The update posting engine posts the obtained record updates by prepending a plurality of respective delta records to the page stub, wherein the plurality of respective delta records include record update information that specifies the respective updates to the logical page that are specified in the respective plurality of update requests.

A consolidation engine consolidates the obtained record updates via a predefined consolidation function, using the plurality of respective delta records that are prepended to the page stub.

The update acquisition module obtains a plurality of update requests that specify incremental updates to a record in the logical page. The update posting engine incrementally posts the obtained specified incremental updates using the obtained plurality of update requests, without accessing the logical page via a read operation.

The update posting engine incrementally posts the obtained specified incremental updates by incrementally prepending a plurality of respective delta records to the page stub. The plurality of respective delta records include key update information that specifies the respective updates to the record.

A data retrieval engine initiates a lookup of a key in the key-value store, to obtain a representation of at least a portion of the logical page, in a current state of the logical page, via a read operation from storage into memory. A merge engine merges the obtained specified incremental updates via a predefined merge function, using the plurality of respective delta records that are prepended to the page stub.

The predefined merge function includes a user-defined merge function.

An incremental flush engine incrementally flushes contents of the logical page, with the plurality of respective delta records that are prepended to the page stub, to a flush buffer storage area that is appended to storage using a single write operation.

The key-value store includes keys that represent terms associated with respective documents, and respective values that represent respective document identifiers. The logical page is stored on secondary storage.

A plurality of update requests that specify incremental updates to a key in a key-value store that is associated with a logical page are obtained.

The key is incrementally updated using the obtained plurality of update requests, without accessing the logical page via a read operation.

A prepending of a page stub to a current state of the logical page is initiated via a page stub delta record representing the page stub, the page stub including an indication of an address of a current state of the logical page, the prepending of the page stub to the current state initiated by installing an address of the update delta record representing the page stub in a mapping table, via an atomic operation.

Incrementally updating the key includes incrementally prepending a plurality of respective delta records to the page stub delta record representing the page stub. The plurality of respective delta records include key update information that specifies the respective updates to the key that is specified in the respective plurality of update requests.

The prepending of the plurality of respective delta records is initiated by installing an address of a current respective incremental delta record in a mapping table, via an atomic operation.

A lookup of the key is initiated, to obtain a representation of at least a portion of the logical page, in a current state of the logical page, via a read operation from storage into memory.

A merge of the obtained incremental updates is initiated via a predefined merge function, using the plurality of respective delta records that are prepended to the page stub.

Incrementally updating the key includes incrementally updating the key using the obtained plurality of update requests, by writing out delta update records to secondary storage incrementally, without accessing the logical page via a read operation.

The page stub includes values of key boundaries associated with the logical page.

A computer program product comprises a computer-readable storage medium storing executable instructions that cause at least one data processing apparatus to obtain a plurality of update requests that specify updates to a logical page associated with a key-value store; and post the updates using the obtained plurality of update requests, without accessing the logical page via a read operation as part of the posting of the obtained updates to the key.

One skilled in the art of data processing will understand that there may be many ways of performing data modifications using blind updates, without departing from the spirit of the discussion herein.

Customer privacy and confidentiality have been ongoing considerations in data processing environments for many years. Thus, example techniques for performing data modifications using blind updates may use user input and/or data provided by users who have provided permission via one or more subscription agreements (e.g., "Terms of Service" (TOS) agreements) with associated applications or services associated with such techniques. For example, users may provide consent to have their input/data transmitted and stored on devices, though it may be explicitly indicated (e.g., via a user accepted agreement) that each party may control how transmission and/or storage occurs, and what level or duration of storage may be maintained, if any. Further, identifiers that may be used to identify devices used by a user may be obfuscated, e.g., by hashing actual user information. It is to be understood that any user input/data may be obtained in accordance with the privacy laws and regulations of any relevant jurisdiction.

Implementations of the various techniques described herein may be implemented in digital electronic circuitry, or in computer hardware, firmware, software, or in combinations of them (e.g., an apparatus configured to execute instructions to perform various functionality).

Implementations may be implemented as a computer program embodied in signals (e.g., a pure signal such as a pure propagated signal). Such implementations will be referred to herein as implemented via a "computer-readable transmission medium," which does not qualify herein as a "computer-readable storage medium" or a "computer-readable storage device" as discussed below.

Alternatively, implementations may be implemented via a machine usable or machine readable storage device (e.g., a magnetic or digital medium such as a Universal Serial Bus (USB) storage device, a tape, hard disk drive, compact disk (CD), digital video disk (DVD), etc.), storing executable instructions (e.g., a computer program), for execution by, or to control the operation of, a computing apparatus (e.g., a data processing apparatus), e.g., a programmable processor, a special-purpose processor or device, a computer, or multiple computers. Such implementations may be referred to herein as implemented via a "computer-readable storage medium" or a "computer-readable storage device" and are thus different from implementations that are purely signals such as pure propagated signals (and thus do not qualify herein as a "computer-readable transmission medium" as discussed above). Thus, as used herein, a reference to a "computer-readable storage medium" or a "computer-readable storage device" specifically excludes signals (e.g., propagated signals) per se.

A computer program, such as the computer program(s) described above, can be written in any form of programming language, including compiled, interpreted, or machine languages, and can be deployed in any form, including as a stand-alone program or as a module, component, subroutine, or other unit suitable for use in a computing environment. The computer program may be tangibly embodied as executable code (e.g., executable instructions) on a machine usable or machine readable storage device (e.g., a computer-readable medium). A computer program that might implement the techniques discussed above may be deployed to be executed on one computer or on multiple computers at one site or distributed across multiple sites and interconnected by a communication network.

Method steps may be performed by one or more programmable processors executing a computer program to perform functions by operating on input data and generating output. The one or more programmable processors may execute instructions in parallel, and/or may be arranged in a distributed configuration for distributed processing. Example functionality discussed herein may also be performed by, and an apparatus may be implemented, at least in part, as one or more hardware logic components. For example, and without limitation, illustrative types of hardware logic components that may be used may include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Processors suitable for the execution of a computer program include, by way of example, both general and special purpose microprocessors, and any one or more processors of any kind of digital computer. Generally, a processor will receive instructions and data from a read only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto optical disks, or optical disks. Information carriers suitable for embodying computer program instructions and data include all forms of nonvolatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT), liquid crystal display (LCD), or plasma monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback. For example, output may be provided via any form of sensory output, including (but not limited to) visual output (e.g., visual gestures, video output), audio output (e.g., voice, device sounds), tactile output (e.g., touch, device movement), temperature, odor, etc.

Further, input from the user can be received in any form, including acoustic, speech, or tactile input. For example, input may be received from the user via any form of sensory input, including (but not limited to) visual input (e.g., gestures, video input), audio input (e.g., voice, device sounds), tactile input (e.g., touch, device movement), temperature, odor, etc.

Further, a natural user interface (NUI) may be used to interface with a user. In this context, a "NUI" may refer to any interface technology that enables a user to interact with a device in a "natural" manner, free from artificial constraints imposed by input devices such as mice, keyboards, remote controls, and the like.

Examples of NUI techniques may include those relying on speech recognition, touch and stylus recognition, gesture recognition both on a screen and adjacent to the screen, air gestures, head and eye tracking, voice and speech, vision, touch, gestures, and machine intelligence. Example NUI technologies may include, but are not limited to, touch sensitive displays, voice and speech recognition, intention and goal understanding, motion gesture detection using depth cameras (e.g., stereoscopic camera systems, infrared camera systems, RGB (red, green, blue) camera systems and combinations of these), motion gesture detection using accelerometers/gyroscopes, facial recognition, 3D displays, head, eye, and gaze tracking, immersive augmented reality and virtual reality systems, all of which may provide a more natural interface, and technologies for sensing brain activity using electric field sensing electrodes (e.g., electroencephalography (EEG) and related techniques).

Implementations may be implemented in a computing system that includes a back end component, e.g., as a data server, or that includes a middleware component, e.g., an application server, or that includes a front end component, e.g., a client computer having a graphical user interface or a Web browser through which a user can interact with an implementation, or any combination of such back end, middleware, or front end components. Components may be interconnected by any form or medium of digital data communication, e.g., a communication network. Examples of communication networks include a local area network (LAN) and a wide area network (WAN), e.g., the Internet.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A system comprising:
at least one hardware processor; and
a non-transitory computer-readable storage medium that stores executable instructions that are executable by the at least one hardware processor, the executable instructions including a page update manager that includes:
an update acquisition module that obtains a plurality of update requests that specify updates for a logical page associated with a key-value store;
an update posting engine that posts the updates using the obtained plurality of update requests, without accessing the logical page via a read operation; and
a page stub manager that initiates a prepending of a page stub to a current state of the logical page via a page stub delta record representing the page stub, by installing an address of the page stub delta record representing the page stub in a mapping table, via an atomic operation.

2. The system of claim 1, wherein:
the page stub manager initiates the prepending of the page stub to the current state of the logical page via the page stub delta record representing the page stub, the page stub including an indication of an address of a current state of the logical page and metadata specifying attributes of the logical page, the prepending of the page stub to the current state initiated by installing an address of the page stub delta record representing the page stub in the mapping table, via an atomic operation.

3. The system of claim 2, wherein:
the update acquisition module obtains a plurality of update requests that specify record updates to the logical page; and
the update posting engine posts the obtained record updates using the obtained plurality of update requests, without accessing the logical page via a read operation.

4. The system of claim 3, wherein:
the update posting engine posts the obtained record updates by prepending a plurality of respective delta records to the page stub, wherein the plurality of respective delta records include record update information that specifies the respective updates to the logical page that are specified in the respective plurality of update requests.

5. The system of claim 4, further comprising:
a consolidation engine that consolidates the obtained record updates via a predefined consolidation function, using the plurality of respective delta records that are prepended to the page stub.

6. The system of claim 2, wherein:
the update acquisition module obtains a plurality of update requests that specify incremental updates to a record in the logical page; and
the update posting engine incrementally posts the obtained specified incremental updates using the obtained plurality of update requests, without accessing the logical page via a read operation.

7. The system of claim 6, wherein:
the update posting engine incrementally posts the obtained specified incremental updates by incrementally prepending a plurality of respective delta records to the page stub, wherein the plurality of respective delta records include key update information that specifies the respective updates to the record.

8. The system of claim 7, further comprising:
a data retrieval engine that initiates a lookup of a key in the key-value store, to obtain a representation of at least a portion of the logical page, in a current state of the logical page, via a read operation from storage into memory; and
a merge engine that merges the obtained specified incremental updates via a predefined merge function, using the plurality of respective delta records that are prepended to the page stub.

9. The system of claim 8, wherein:
the predefined merge function includes a user-defined merge function.

10. The system of claim 2, further comprising:
an incremental flush engine that incrementally flushes contents of the logical page, with the plurality of respective delta records that are prepended to the page stub, to a flush buffer storage area that is appended to storage using a single write operation.

11. The system of claim 1, wherein:
the key-value store includes keys that represent terms associated with respective documents, and respective values that represent respective document identifiers.

12. The system of claim 1, wherein:
the logical page is stored on secondary storage.

13. A method comprising:
obtaining a plurality of update requests that specify incremental updates to a key in a key-value store that is associated with a logical page;
incrementally updating the key using the obtained plurality of update requests, without accessing the logical page via a read operation; and
initiating a prepending of a page stub to a current state of the logical page via a page stub delta record representing the page stub, the prepending of the page stub to the current state initiated by installing an address of the update delta record representing the page stub in a mapping table, via an atomic operation.

14. The method of claim 13, wherein:
the page stub includes an indication of an address of a current state of the logical page.

15. The method of claim 14, wherein:
incrementally updating the key includes incrementally prepending a plurality of respective delta records to the page stub delta record representing the page stub, wherein the plurality of respective delta records include key update information that specifies the respective updates to the key that is specified in the respective plurality of update requests.

16. The method of claim 15, wherein:
the prepending of the plurality of respective delta records is initiated by installing an address of a current respective incremental delta record in a mapping table, via an atomic operation.

17. The method of claim 16, further comprising:
initiating a lookup of the key, to obtain a representation of at least a portion of the logical page, in a current state of the logical page, via a read operation from storage into memory; and
initiating a merge of the obtained incremental updates via a predefined merge function, using the plurality of respective delta records that are prepended to the page stub.

18. The method of claim 13, wherein:
incrementally updating the key includes incrementally updating the key using the obtained plurality of update requests, by writing out delta update records to secondary storage incrementally, without accessing the logical page via a read operation.

19. The method of claim 13, wherein:
the page stub includes values of key boundaries associated with the logical page.

20. A system comprising:
at least one hardware device processor; and
a non-transitory computer-readable storage medium storing executable instructions that cause the at least one hardware device processor to:
obtain a plurality of update requests that specify updates to a logical page associated with a key-value store; and
post the updates using the obtained plurality of update requests, without accessing the logical page via a read operation as part of the posting of the obtained updates to the key; and
initiate a prepending of a page stub to a current state of the logical page via a page stub delta record representing the page stub, by installing an address of the page stub delta record representing the page stub in a mapping table, via an atomic operation.

* * * * *